(12) United States Patent
Nagata et al.

(10) Patent No.: US 10,515,249 B2
(45) Date of Patent: *Dec. 24, 2019

(54) OPTICAL INFORMATION READING DEVICE

(71) Applicant: Keyence Corporation, Osaka (JP)

(72) Inventors: Hidezumi Nagata, Osaka (JP); Taichi Tajika, Osaka (JP); Hiroomi Ohori, Osaka (JP); Taiga Nomi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,341

(22) Filed: Feb. 22, 2019

(65) Prior Publication Data
US 2019/0188437 A1    Jun. 20, 2019

Related U.S. Application Data

(63) Continuation of application No. 15/849,742, filed on Dec. 21, 2017, now Pat. No. 10,262,177.

(30) Foreign Application Priority Data

Feb. 23, 2017 (JP) .................................. 2017-032332

(51) Int. Cl.
| | | |
|---|---|---|
| *G06K 15/00* | (2006.01) | |
| *G06K 7/14* | (2006.01) | |
| *G06K 7/10* | (2006.01) | |

(52) U.S. Cl.
CPC ....... *G06K 7/1417* (2013.01); *G06K 7/10722* (2013.01); *G06K 7/10752* (2013.01)

(58) Field of Classification Search
CPC ........... G06C 7/10; G06K 13/00; G06K 13/02
USPC ........................... 235/462.11, 462.15, 462.23
See application file for complete search history.

(56) References Cited

U.S. PATENT DOCUMENTS

| | | | | |
|---|---|---|---|---|
| 4,958,291 | A * | 9/1990 | Mamone | G06F 21/60 235/379 |
| 5,177,346 | A * | 1/1993 | Chisholm | G06K 7/10594 235/462.06 |
| 5,541,419 | A * | 7/1996 | Arackellian | G02B 27/28 235/470 |

(Continued)

FOREIGN PATENT DOCUMENTS

| | | |
|---|---|---|
| JP | H9-006891 | 1/1997 |
| JP | 2016-033785 | 3/2016 |
| JP | 2016-033787 | 3/2016 |

*Primary Examiner* — Daniel St Cyr
(74) *Attorney, Agent, or Firm* — Kilyk & Bowersox, P.L.L.C.

(57) ABSTRACT

[Object] To enhance accuracy at the time of setting with consideration of a cell size of a code when an exposure time is automatically set. [Means to solve the problems] An upper limit of an exposure time of an imaging part as a restriction condition for reading a code attached to a workpiece is calculated based on a moving speed of the workpiece, which is inputted by an input part, and a cell size, which is calculated by a cell size calculation part. An exposure time of the imaging part is set within the restriction condition by analyzing a plurality of images, which includes a code and is obtained by taking images multiple times by changing the exposure time of the imaging part.

12 Claims, 31 Drawing Sheets

(56) References Cited

U.S. PATENT DOCUMENTS

| | | | | |
|---|---|---|---|---|
| 6,105,869 A | * | 8/2000 | Scharf | G06K 7/10742 |
| | | | | 235/454 |
| 7,489,415 B2 | * | 2/2009 | Furuta | G06K 9/2054 |
| | | | | 358/1.15 |
| 9,430,690 B2 | | 8/2016 | Nagata et al. | |
| 9,542,583 B2 | | 1/2017 | Nagata et al. | |
| 2018/0239937 A1 | | 8/2018 | Nagata et al. | |
| 2018/0239938 A1 | | 8/2018 | Nagata et al. | |

\* cited by examiner

FIG. 31
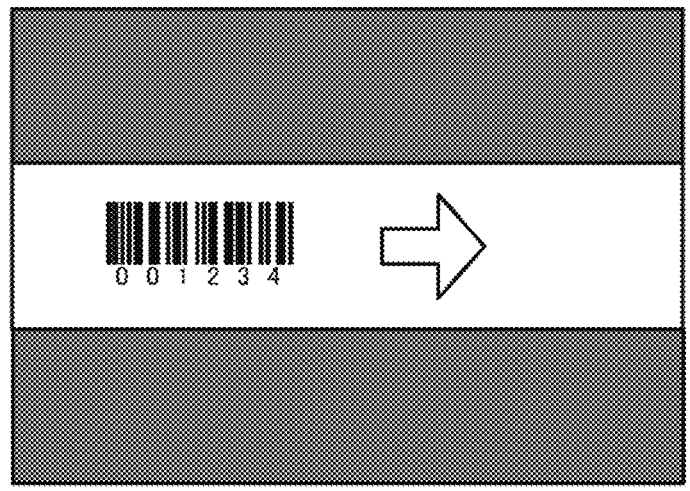
HORIZONTAL DIRECTION CONVEYANCE
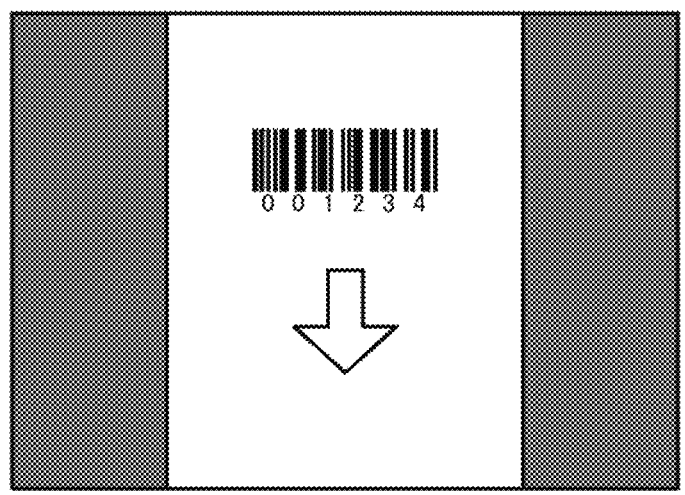
VERTICAL DIRECTION CONVEYANCE FIG. 32
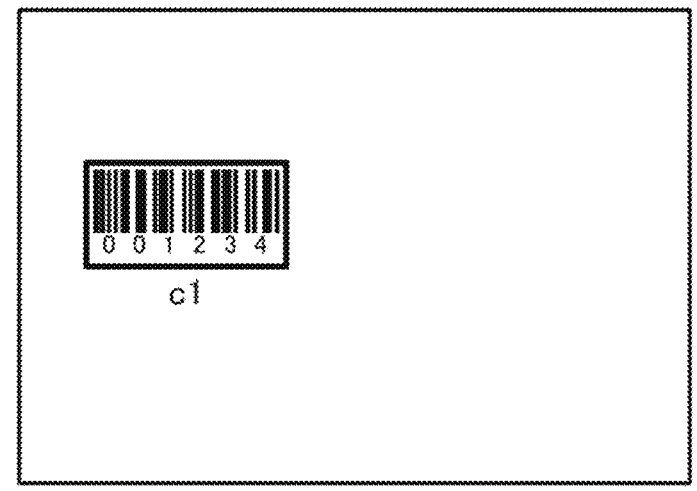
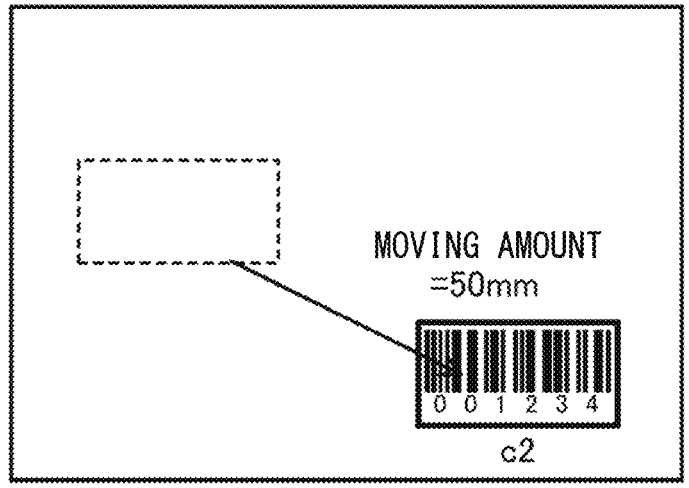

OPTICAL INFORMATION READING DEVICE

CROSS-REFERENCE TO RELATED APPLICATIONS

This application is a continuation of U.S. patent application Ser. No. 15/849,742, filed Dec. 21, 2017. The present application claims foreign priority based on Japanese Patent Application No. 2017-032332, filed Feb. 23, 2017, the contents of which is incorporated herein by reference.

TECHNOLOGICAL FILED

The present invention relates to an optical information reading device which optically reads information.

BACKGROUND TECHNOLOGY

In recent years, code readers capable of tracing articles in distribution channels from a manufacturing stage to a consumption stage or a disposal stage, so called traceability, have been considered important, and such code readers for the purpose of the traceability have become popular. Further, other than the traceability, the code readers have been used in various fields.

In general, the code readers have a configuration to read images of bar codes or two-dimensional codes, etc., which are attached to workpieces, and the codes on the obtained images are read and binarized by image processing, and they are decoded so as to read information. The code readers are the devices which optically read information, so that it is also called as optical information reading devices (see e.g. Japanese Patent Application Publication No. 2016-33787 and Japanese Patent Application Publication No. H09-6891).

In Japanese Patent Application Publication No. 2016-33787, it is configured to perform a tuning step in which imaging parameters such as an exposure time, a gain of a camera, etc. are automatically set to be an optimum value, before operation of an optical information reading device, that is, at the time of setting.

Further, in Japanese Patent Application Publication No. H09-6891, a correspondence table between a conveyance speed of a workpiece and an appropriate exposure time is prepared in advance, and it is configured that the exposure time in response to the conveyance speed can be set by using the correspondence table.

DISCLOSURE OF THE INVENTION

Problems to be Solved by the Invention

Specifically, when an image of a code attached to a workpiece is taken during a conveyance, a blur easily occurs. The blur occurs greatly dependent on a conveyance speed of a workpiece. However, it is not only that but also greatly dependent on a size of a cell which constitutes a code. For example, as the size of the cell becomes smaller, it becomes weaker for the occurrence of blur. On the other hand, as the size of the cell becomes larger, it becomes stronger for the occurrence of blur.

From the view in which the blur is suppressed, in Japanese Patent Application Publication No. H09-6891, an appropriate exposure time is attempted to be set by using the correspondence table between the conveyance speed of the workpiece and the exposure time. However, when the exposure time is set, it does not consider the cell size. Accordingly, it is unclear whether or not the set exposure time is the optimum time for the conveyance speed of a workpiece and the cell size, so that it is considered that there is still room for improvement. Specifically, when the exposure time is determined by only the conveyance speed of a workpiece, there is a case in which the exposure time may be too short from the view point in which the cell size is considered. In this case, the conveyance speed of the workpiece could be set faster but it had been set slow. Therefore, in this case, the high-speed reading performance of the optical information reading device cannot be sufficiently performed.

The present invention was made in consideration of the aforementioned circumstances. An object of the present invention is to enhance accuracy at the time of setting with consideration of a cell size of a code when an exposure time is automatically set.

Means for Solving the Problems

In order to achieve the aforementioned object, in the present invention, an optical information reading device includes an imaging part including an imaging element which takes an image of a code attached to a workpiece which moves; an input part inputting a moving speed of the workpiece; a cell size setting part setting a size of a cell which constitutes the code on the image obtained by the imaging part; an imaging condition setting part calculating an upper limit of an exposure time of the imaging part as a restriction condition for reading the code attached to the workpiece based on the moving speed of the workpiece, which is inputted by the input part, and the cell size, which is set by the cell size setting part, and the imaging condition setting part setting the exposure time of the imaging part within a range of the restriction condition by analyzing a plurality of images, which includes a code and is obtained by taking images multiple times by changing the exposure time or the gain of the imaging part; and a decoding part decoding a code included in an image, which is newly obtained by the imaging part, by using the exposure time which is set by the imaging condition setting part.

With such configuration, the upper limit of the exposure time can be calculated based on the moving speed of the workpiece and the cell size which constitutes the code. An optimum condition (exposure time, etc.) for reading can be set in a range less than the upper limit of the exposure time by analyzing the plurality of images obtained by taking images multiple times by changing the exposure time or the gain (or at least exposure time). Accordingly, it can set not only the moving speed of the workpiece but also the optimum exposure time in which the cell size is reflected. A code included in an image, which is newly obtained by the imaging part by using the exposure time, can be decoded, so that the reading accuracy can be enhanced.

Further, the optical information reading device includes a distance setting part obtaining a distance from the imaging part to the code; and the characteristic information storage part storing a first characteristic information which determines a visual field range of the imaging part in response to the distance from the imaging part to the code. The cell size setting part may be configured to calculate a cell size based on the code included in the image which is taken by the imaging part, the distance obtained by the distance setting part, and the first characteristic information stored in the characteristic information storage part.

Further, the imaging condition setting part may be configured to set a gain by analyzing the plurality of images obtained by taking images multiple times by changing the gain to the imaging part, and the decoding part may be configured to decode a code included in an image, which is newly obtained by the imaging part by using the gain which is set by the imaging condition setting part.

Further, the imaging condition setting part may be configured to take images of a code multiple times by the imaging part by changing the exposure time within the restriction condition.

Further, the characteristic information storage part stores a second characteristic information which determines a focusing range in response to a separation distance from the imaging part, and the input part is configured to input variation information related to a variation width of the distance from the imaging part to the code. The optical information reading device further includes a recommended separation distance determination part calculating a recommended separation distance between the optical information reading device and the code based on the second characteristic information stored in the characteristic information storage part, the cell size which is set in the cell size setting part, and the variation information which is inputted by the input part; and a display part displaying the recommended separation distance which is calculated by the recommended separation distance determination part.

Further, the imaging part is provided with an optical system, which includes a focusing lens, and an autofocus mechanism, which adjusts a focusing position by the focusing lens. The optical information reading device further includes a correspondence relation storage part storing a correspondence relation between an adjustment amount of the focusing lens by the autofocus mechanism, and the distance from the imaging part to the code. The distance setting part may be configured to obtain the distance from the imaging part to the code based on the adjustment amount when a focusing by the focusing lens is completed, and the correspondence relation.

EFFECTS OF THE INVENTION

According to the present invention, the conveyance speed of the workpiece and the optimum exposure time in which the cell size is reflected can be set, so that the reading accuracy can be enhanced.

BRIEF DESCRIPTION OF THE DRAWINGS

FIG. 31 is a diagram showing a relation between a conveyance direction and a visual field range;

FIG. 32 is a diagram schematically showing a method for detecting a moving speed of a code at the time of verification.

PREFERRED EMBODIMENTS OF THE INVENTION

Hereinafter, the embodiments of the present invention will be described with reference to the drawings. The following description of the preferred embodiments is merely for illustrative purposes and is not intended to limit the scope of the present invention, and the application or use thereof.

Figure 1:
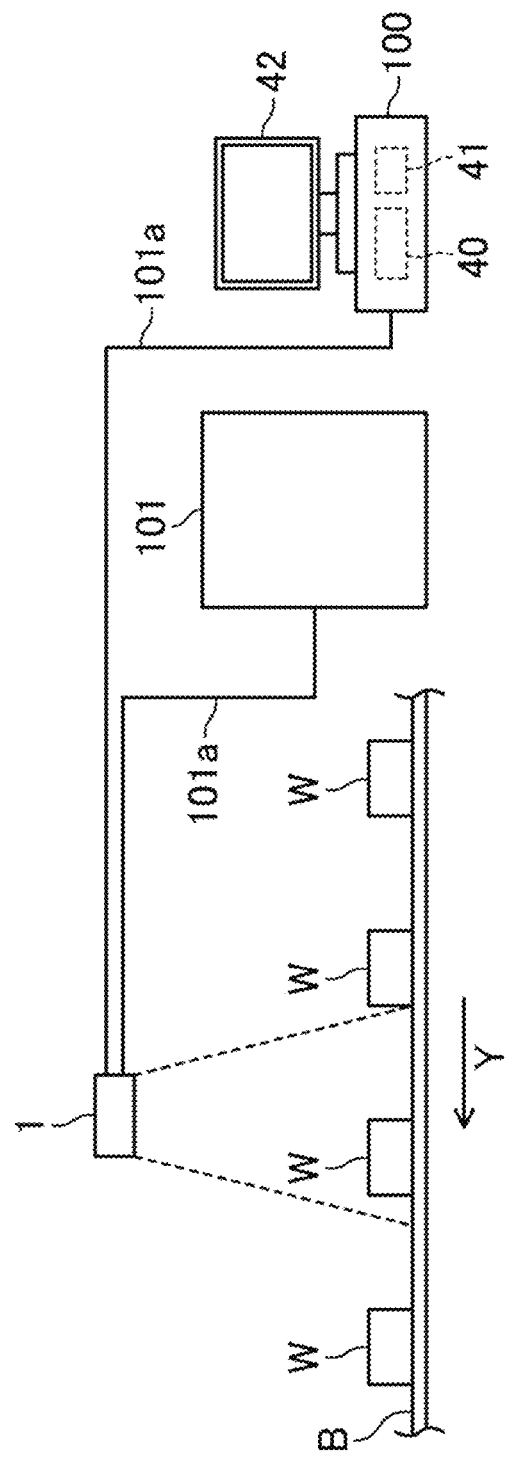
FIG. 1 is an explanatory diagram at the time of operation of an optical information reading device.

FIG. 1 is a schematic diagram at the time of operation of an optical information reading device 1 according to the embodiment of the present invention. In this example, a plurality of workpieces W in a state being placed on an upper surface of a belt conveyer for conveyance B is conveyed in an arrow Y direction as shown in FIG. 1, and the optical information reading device 1 according to the embodiment is mounted in a place separated upwardly from the workpieces W. The optical information reading device 1 is the code reader which is configured to take images of codes attached to the workpieces W, and a decoding processing is performed to the codes included in the obtained images so as to read the information. The optical information reading device 1 may be fixed to a bracket, etc. (not shown) so as not to move at the time of operation, or it may be held by a robot (not shown) or a user, etc. so as to move at the time of operation. Further, the codes of the workpieces W in a stationary state may be read by the optical information reading device 1. The phrase "at the time of operation"

means the operation when the codes attached to the workpieces W conveyed by the belt conveyer for conveyance B are sequentially read.

Further, a code is attached to an upper surface of each workpiece W. The code includes both of a bar code and a two-dimensional code. As the two-dimensional codes, for example, there are a QR Code (registered trademark), a Micro QR Code, a DataMatrix; a Data Code, a Veri Code, an Aztec Code, a PDF417, a Maxi Code, etc. In the two-dimensional codes, there are a stack-type and a matrix-type, and the present invention can be applied to any of these two-dimensional codes. The codes may be attached to the workpieces W by direct printing or imprinting, or the codes may be attached to the workpieces W after printing on a label, so that any means or methods can be used.

The optical information reading device 1 is wire-connected to a computer 100 and a programmable logic controller (PLC) 101 by signal lines 100a, 101a, respectively. However, it is not limited. A communication module may be incorporated with the optical information reading device 1, the computer 100, and the PLC 101, and the optical information reading device 1 may be wirelessly connected with the computer 100 and the PLC 101. The PLC 101 is the control device which performs a sequence control to the belt conveyer for conveyance B and the optical information reading device 1, and a generic PLC may be used. The computer 100 may be a generic, an exclusive electronic computer, an exclusive portable terminal, etc.

Further, at the time of operation, the optical information reading device 1 receives reading start trigger signals, which specify a start timing of the code reading, from the PLC 101 through the signal line 101a. The optical information reading device 1 performs taking images and decoding codes based on the reading start trigger signals. After that, the decoding results are transmitted to the PLC 101 through the signal line 101a. In this way, at the time of operation of the optical information reading device 1, the inputs of the reading start trigger signals and the outputs of the decoding results are repeatedly performed between the optical information reading device 1 and the external control device such as the PLC 101, etc. through the signal line 101a. The inputs of the reading start trigger signals and the outputs of the decoding results may be performed between the optical information reading device 1 and the PLC 101 through the signal line 101a as described above, or any other signal lines, which are not shown, may be used. For example, a sensor for detecting the arrival of workpieces W and the optical information reading device 1 are directly connected, and the reading start trigger signals may be inputted to the optical information reading device 1 from the sensor.

[Overall Structure of Optical Information Reading Device 1]

As shown in FIGS. 2 to 6, the optical information reading device 1 is provided with a device body 2 and a polarizing filter attachment 3. The polarizing filter attachment 3 may be omitted. The device body 2 is provided with an illumination part 4, an imaging part 5, a display part 6, a power connector 7, and a signal line connector 8. Further, the device body 2 is provided with an indicator 9 shown in FIG. 5, an aimer 10 shown in FIG. 3, a select button 11 shown in FIG. 5, and an enter button 12.

In the explanation of this embodiment, the front face, the rear face, the upper face, the lower face, the left face, and the right face of the optical information reading device 1 are defined, but this is just for the convenience of the explanation, so that it is not limited to the direction of the optical information reading device 1 when it is used. That is, as shown in FIG. 1, the optical information reading device 1 may be usable in the following postures: the front face of the optical information reading device 1 may be set downwardly when it is used; the front face of the optical information reading device 1 may be set upwardly when it is used; or the front face of the optical information reading device 1 may be set inclinedly when it is used. Further, the left and right directions of the optical information reading device 1 can be called as a width direction.

Figure 2:
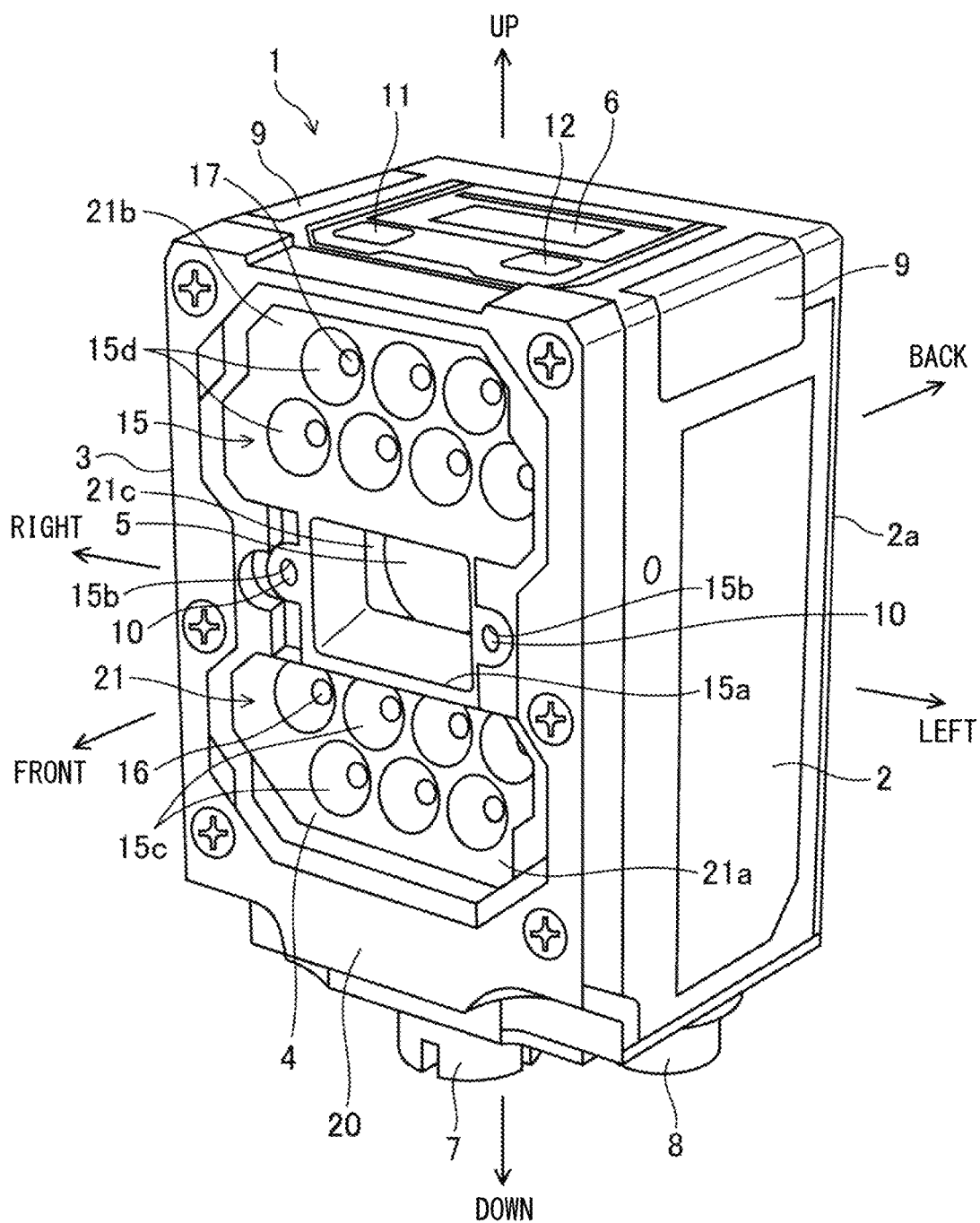
FIG. 2 is a perspective view showing the optical information reading device.
Figure 6:
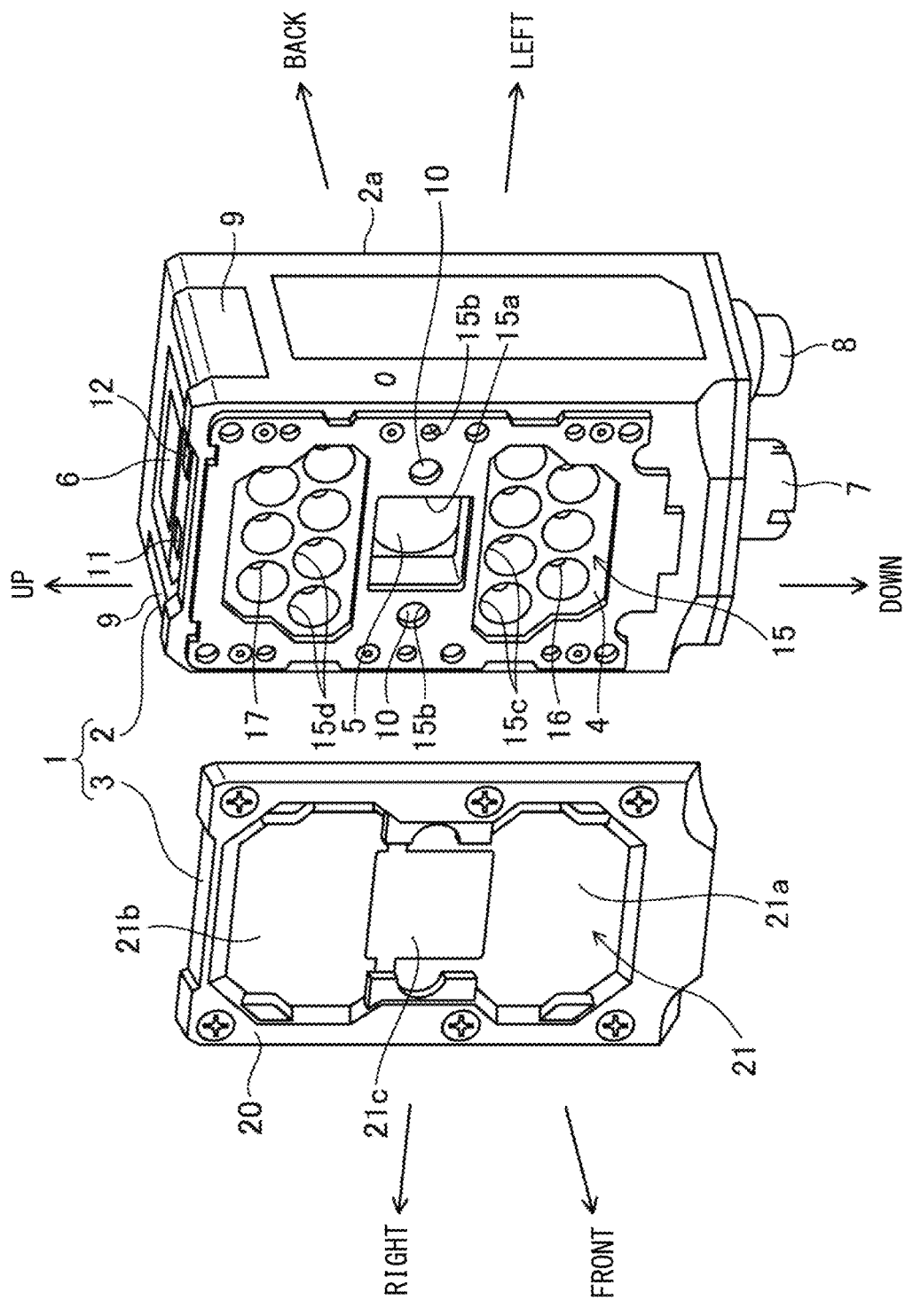
FIG. 6 is a perspective view showing a state in which a polarizing filter attachment is removed from a main body.
Figure 11:
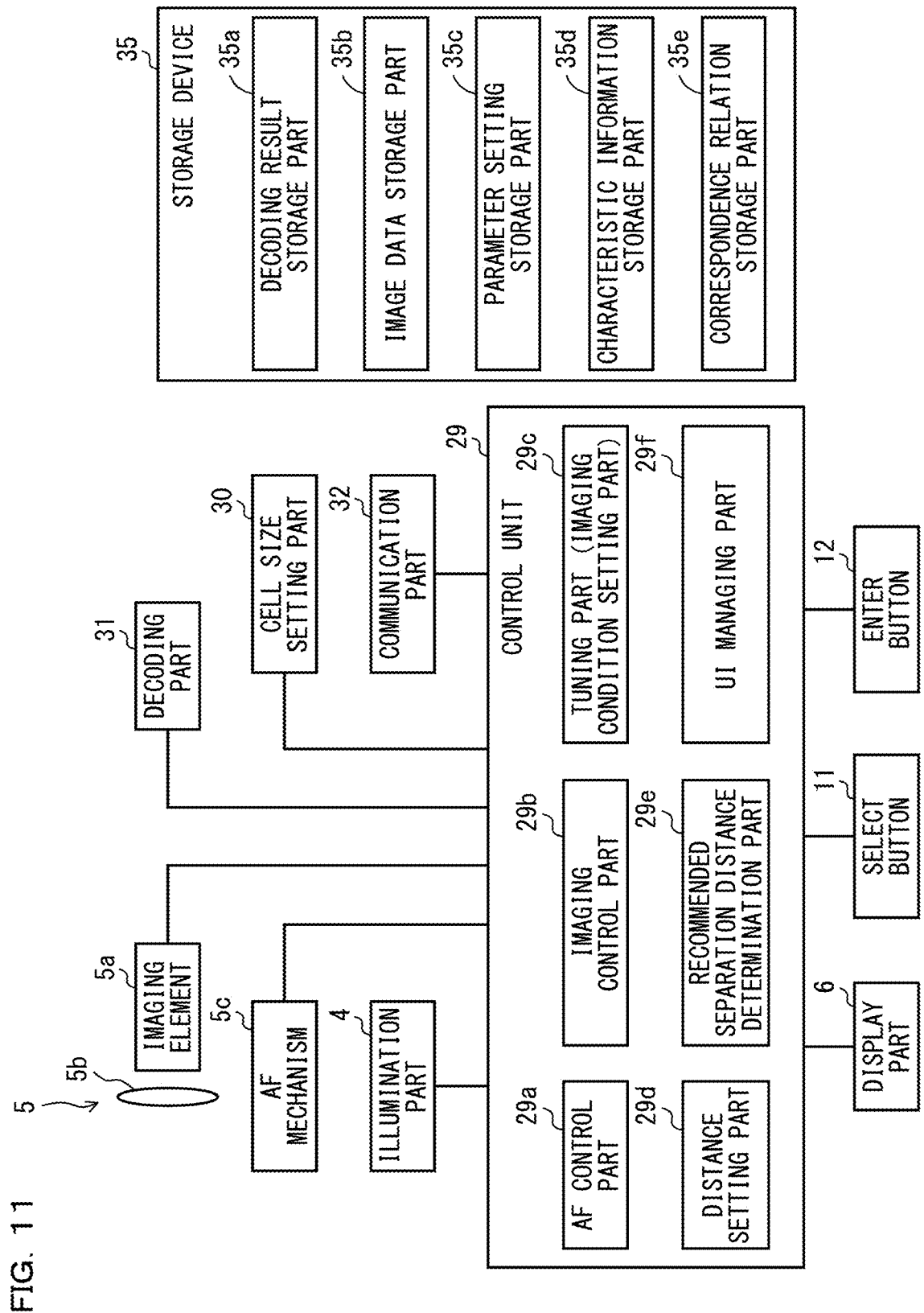
FIG. 11 is a block diagram showing the optical information reading device.

The device body 2 is provided with an approximately rectangular box-shaped casing 2a which is vertically long. A control unit 29 and a decoding part 31, etc. shown in FIG. 11 are provided inside the casing 2a. As shown in FIGS. 2 and 6, the polarizing filter attachment 3 is detachably mounted to the front face of the casing 2a. Further, on the front face of the casing 2a, an illumination part 4, which illuminates at least codes on the workpieces W by irradiating light in the front direction of the optical information reading device 1, and an imaging part 5, which takes images of at least a code on the workpieces W located in the front direction of the optical information reading device 1, are provided. In addition, on the front face of the casing 2a, the aimer 10 which is configured by a light emitting body such as a light emitting diode (LED), etc. is provided. The aimer 10 is used as a guide to determine an imaging range of the imaging part 5 or an optical axis of the illumination part 4 by irradiating light in the front direction of the optical information reading device 1. The optical information reading device 1 may be set by the user with reference to the light irradiated from the aimer 10.

A display part 6 is provided on the upper face of the casing 2a. Further, on the upper face of the casing 2a, the select button 11 and the enter button 12 used at the time of setting of the optical information reading device 1 or at the time of inputting various types of information are provided. The selected button 11 and the enter button 12 are connected to the control unit 29, and the control unit 29 is capable of detecting the operation status of the select button 11 and the enter button 12. The select button 11 is the button for selecting an option among the plurality of options displayed in the display part 6. The enter button 12 is the button for confirming the option selected by the select button 11. The select button 11 and the enter button 12 are the input part.

Further, an indicator 9 is provided respectively in both left and right sides of the upper face of the casing 2a. The indicator 9 is connected to the control unit 29, and it may be configured with a light emitting body such as a light emitting diode, etc. The operation status of the optical information reading device 1 can be notified externally by the lighting state of the indicator 9.

On the lower face of the casing 2a, a power connector 7, in which a power wiring for supplying electric power to the optical information reading device 1 is connected, and an ethernet connector 8 for signal lines 100a, 101a connected to the computer 100 and the PLC 101 are provided. The ethernet standard is one example, but a signal line with a standard other than the ethernet standard may be used.

[Structure of Illumination Part 4]

Figure 3:
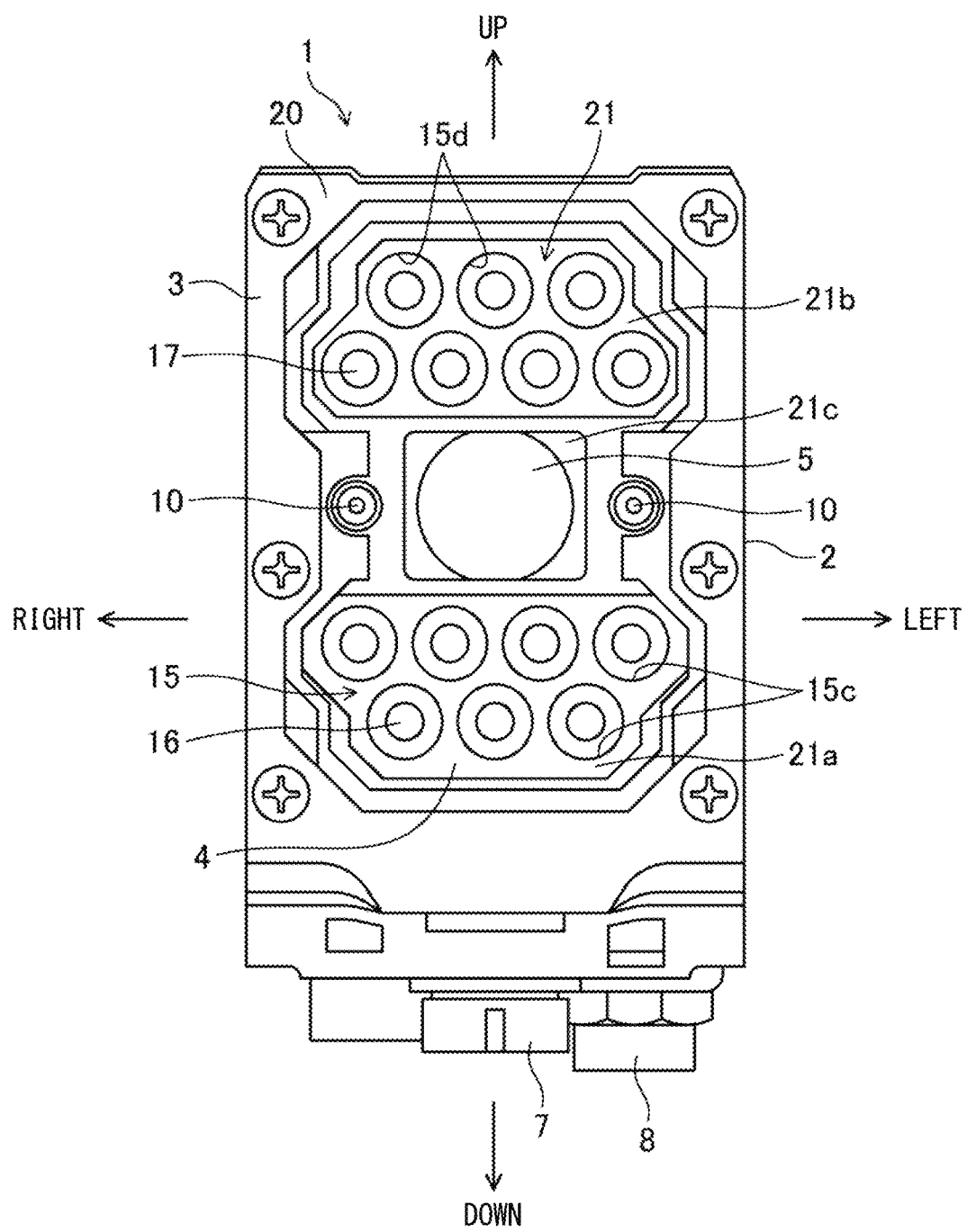
FIG. 3 is a diagram showing the optical information reading device viewed from an illumination part side.
Figure 4:
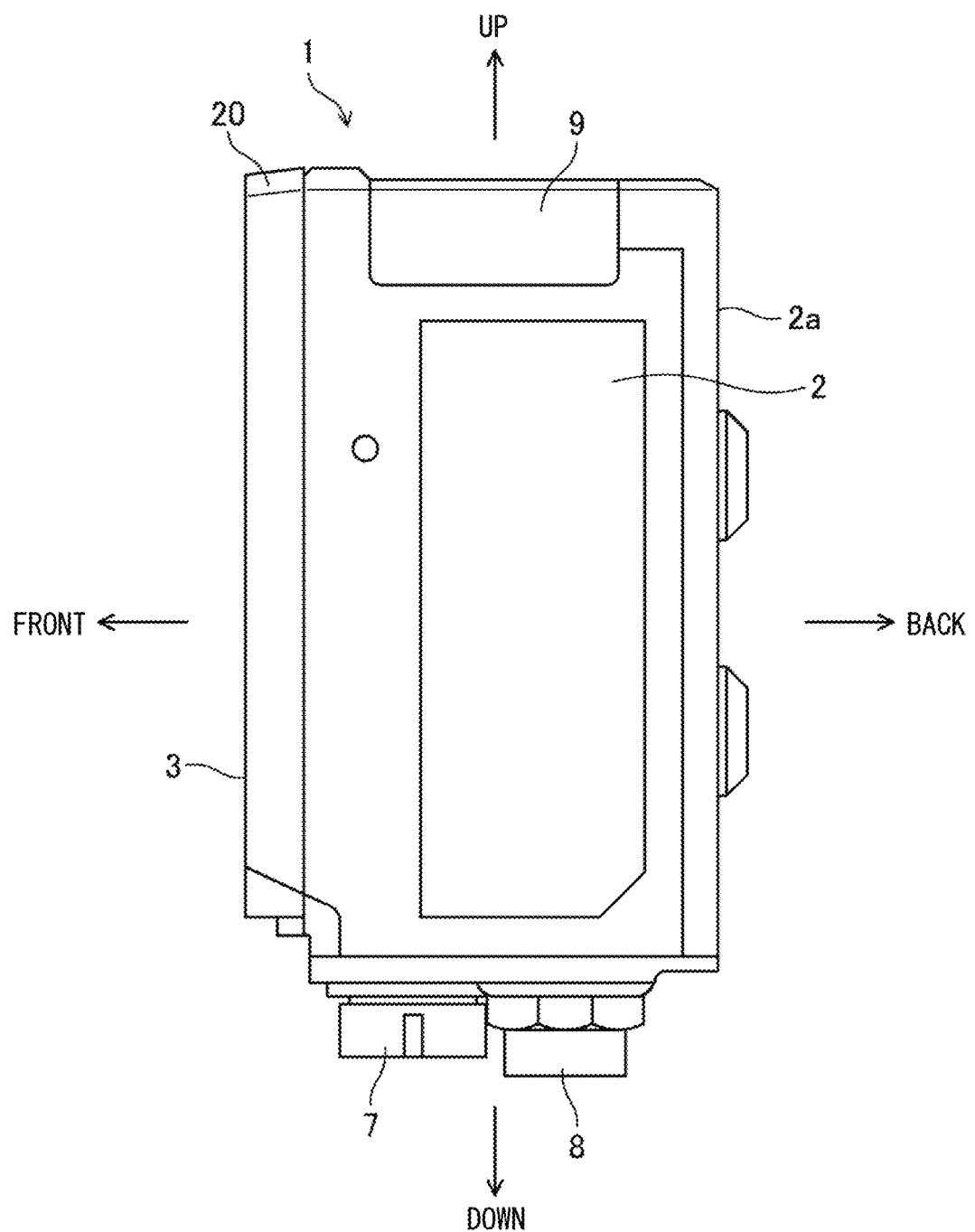
FIG. 4 is a side surface view showing the optical information reading device.
Figure 5:
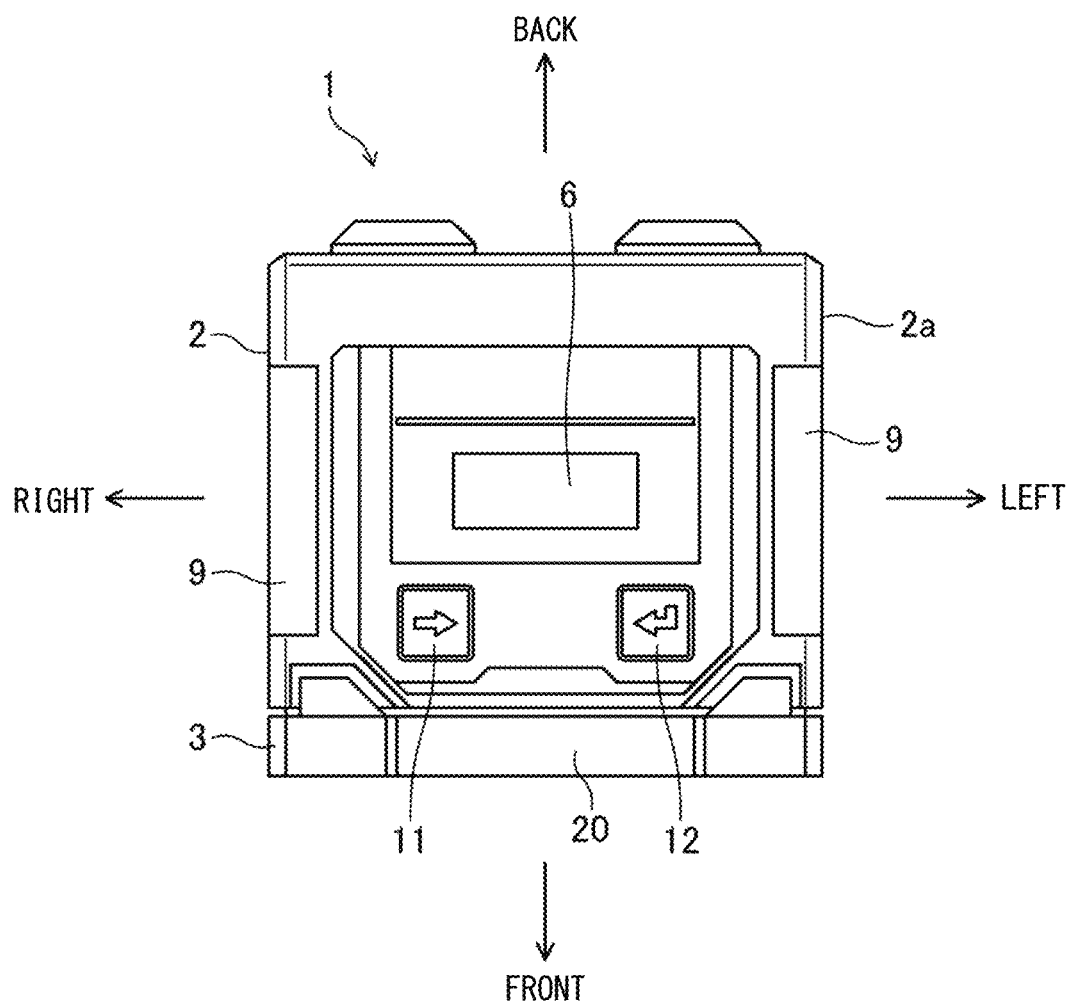
FIG. 5 is a diagram showing the optical information reading device viewed from a display part side.
Figure 7:
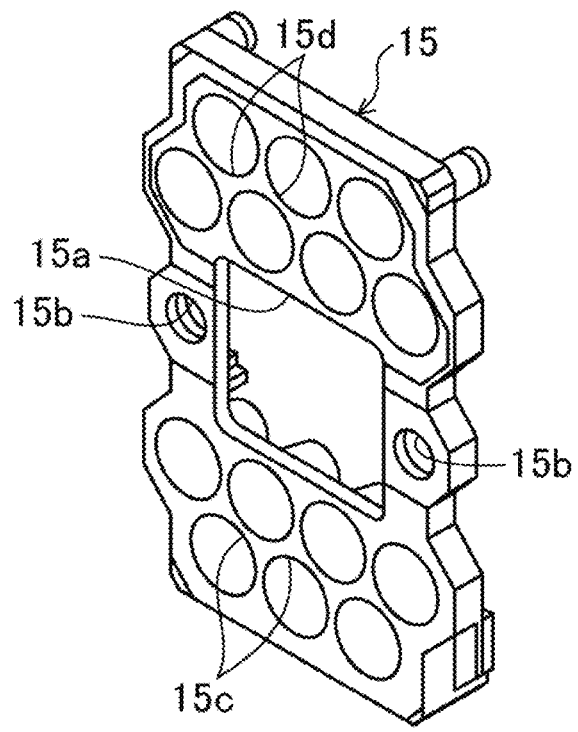
FIG. 7 is a perspective view showing a reflector.
Figure 8:
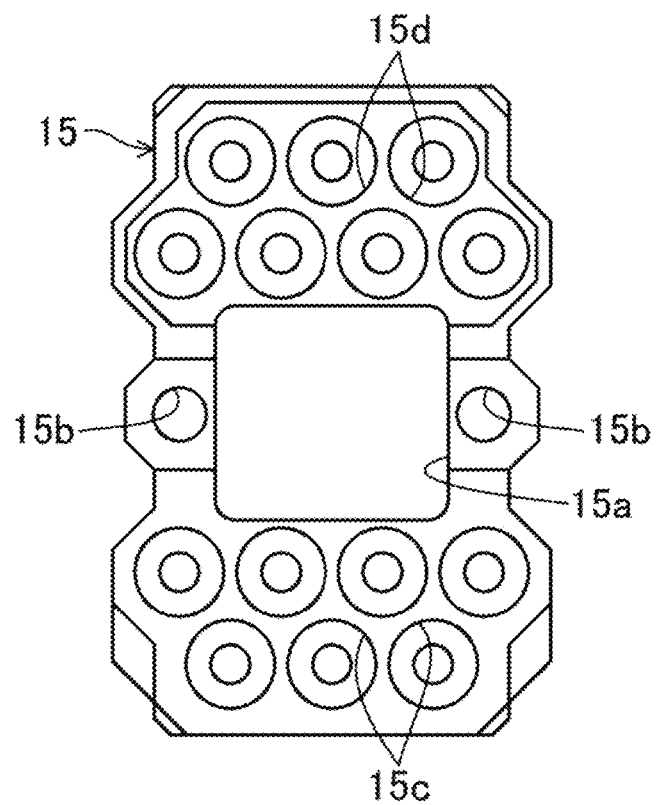
FIG. 8 is a front view showing the reflector.

The illumination part 4 is provided with a reflector 15 as shown in FIGS. 7 and 8, a plurality of first light emitting diodes 16, and a plurality of second light emitting diodes 17 as shown in FIG. 3, etc. The first light emitting diodes 16 and the second light emitting diodes 17 are electrically connected to the control unit 29 and are individually controlled by the control unit 29, so that these lights can be separately turned on and off.

As shown in FIGS. 7 and 8, the reflector 15 has a plate shape which extends from the upper part to the lower part of the front face of the optical information reading device 1. Seven of the first light emitting diodes 16 and seven of the second light emitting diodes 17 are provided, but the numbers of the first light emitting diodes 16 and the second light emitting diodes 17 are not limited to this example. The first light emitting diodes 16 and the second light emitting diodes 17 are arranged in the back side of the reflector 15, and the optical axis is provided to irradiate light forward. At the middle part in the upper and lower direction of the reflector 15, an opening part for imaging 15a is formed to allow the imaging part 5 to face outside. In the both left and right sides of the opening part for imaging 15a in the reflector 15, an opening part for aimer 15b in order to pass through the light of the aimer 10 is provided.

In the lower section of the reflector 15 which is lower than the opening part for imaging 15a, first holes 15c whose numbers are equal to the number of the first light emitting diodes 16, that is seven, are formed to pass through the light of the first light emitting diodes 16 and the light is condensed and irradiated forward. The shape of these first holes 15c is the same shape which is a cone-shape so as to gradually diametrically expand forward. A plating such as a gold plating, etc. is applied to the inner surface of the first holes 15c in order to enhance the reflectivity of the light.

Four of the first holes 15c among seven of the first holes 15c are arranged in a line in the left and right direction (width direction) of the optical information reading device 1. The remaining three of the first holes 15c are arranged, so that the center of the remaining three first holes 15c are lower than the center of the aforementioned four first holes 15c, and the remaining three first holes 15c are positioned between the centers of the adjacent first holes 15c, 15c among the aforementioned four first holes, respectively. In this way, seven of the first holes 15c can be arranged densely. The first light emitting diodes 16 are arranged in the centers of the first holes 15c, respectively.

In the upper section of the reflector 15 which is upper than the opening part for imaging 15a, the second holes 15d whose numbers are equal to the number of the second light emitting diodes 17, that is seven, are formed to pass through the light of the second light emitting diodes 17 and the light is condensed and irradiated forward. The shape of these second holes 15d is the same shape as formed in the first holes 15c, and a plating which is the same plating as applied to the first holes 15c is applied to the inner surface of the second holes 15d.

Four of the second holes 15d among seven of the second holes 15d are arranged in a line in the left and right direction (width direction) of the optical information reading device 1. The remaining three of the second holes 15d are arranged so that the center of the remaining three second holes 15d are upper than the center of the aforementioned four second holes 15d, and the remaining three second holes 15d are positioned between the centers of the adjacent second holes 15d, 15d among the aforementioned four second holes, respectively. In this way, seven of the second holes 15c can be arranged densely. The second light emitting diodes 17 are arranged in the centers of the second holes 15d, respectively.

The illumination part 4 may be formed separately from the imaging part 5. In this case, the illumination part 4 and the imaging part 5 may be connected by a wired line or a wireless line. Further, the control unit 29 as described later may be incorporated in the illumination part 4, or may be incorporated in the imaging part 5.

[Structure of Polarizing Filter Attachment 3]

Figure 9:
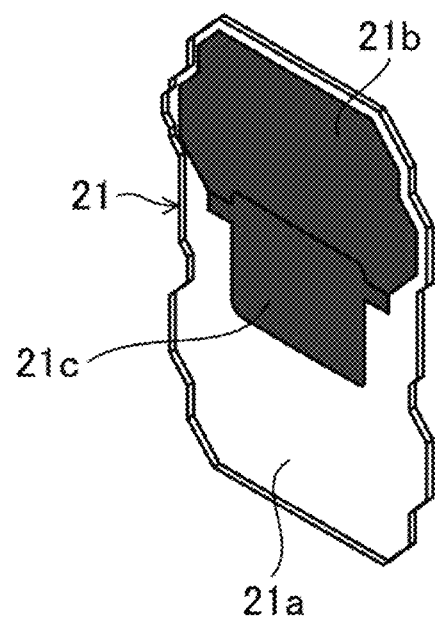
FIG. 9 is a perspective view showing a translucent panel.
Figure 10:
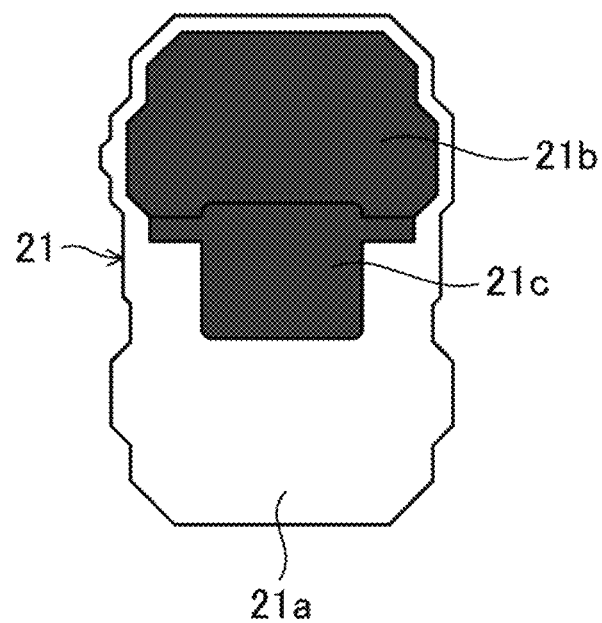
FIG. 10 is a front view showing the translucent panel.

As shown in FIG. 6, the polarizing filter attachment 3 is provided with a frame member 20 and a translucent panel 21. The frame member 20 has an outer shape which substantially matches with the outer shape of the front face of the optical information reading device 1. The translucent panel 21 is provided in the inner part of the frame member 20. The translucent panel 21 is formed to cover the first light emitting diodes 16 and the second light emitting diodes 17 from the front side and is also formed to cover the imaging part 5 from the front side. As shown in FIGS. 9 and 10, a part where the translucent panel 21 covers the first light emitting diodes 16, that is the lower section 21a where the light of the first light emitting diodes 16 is irradiated, is the part which is colorless and transparent and does not have the polarizing filter. On the other hand, a part which covers the second light emitting diodes 17 in the translucent panel 21, that is, the upper section 21b is the part where the light of the second light emitting diodes 17 is emitted, and the upper section 21b is the part where the polarizing filter is provided. Further, the middle section 21c between the lower section 21a and the upper section 21b in the translucent panel 21 is the part to cover the imaging part 5, and this is the part where the light incident to the imaging part 5 is transmitted. Also, the middle section 21c is the part where the polarizing filter is provided. The polarization direction of the polarizing filter of the upper section 21b and the polarization direction of the polarizing filter of the middle section 21c are different by, for example, 90 degrees. In FIGS. 9 and 10, the part where polarizing filter is provided is shown as a light-colored part. In FIGS. 2, 3, and 6, the part where the polarizing filter is provided is shown as an uncolored part, but in fact, it is light-colored in the same way as FIGS. 9 and 10.

That is, the light irradiated from the first light emitting diodes 16 reaches the workpieces W without passing through the polarizing filter, and on the other hand, the light irradiated from the second light emitting diodes 17 reaches the workpieces W through the polarizing filter. The light reflected from the workpieces W enters the imaging part 5 through the polarizing filter.

Accordingly, without removing the polarizing filter attachment 3 by the user, the optical information reading device 1 electrically switches either of the first light emitting diodes 16 and the second light emitting diodes 17 to be turned on. Specifically, regarding the workpieces W (for example, casting, etc.) in which no polarizing filter has more advantages, the first light emitting diodes 16 are turned on and the second light emitting diodes 17 are turned off. On the other hand, regarding the workpieces W (for example, in a case in which two-dimensional codes are attached to print substrates, milling machined surfaces, black resins, etc.), the first light emitting diodes 16 are turned off and the second light emitting diodes 17 are turned on.

[Structure of Imaging Part 5]

FIG. 11 is a block diagram showing the structure of the optical information reading device 1. As shown in FIG. 11, the imaging part 5 is provided with an imaging element 5a, which takes images of codes attached to the workpieces W and irradiated by the aforementioned illumination part 4, an optical system 5b having a lens, etc., and an Auto-Focus mechanism (AF mechanism) 5c. In the optical system 5b, there is a configuration to enter the light reflected from the part where codes are attached on the workpieces W. The imaging element 5a is an image sensor, which is made of a Charge-Coupled Device (CCD), a Complementary Metal Oxide Semiconductor (CMOS), etc., to convert electric signals from the images of the codes obtained through the optical system 5b. The imaging element 5a is connected to the control unit 29, and the electric signals converted by the imaging element 5a are inputted to the control unit 29. Further, the AF mechanism 5c is the mechanism in which focusing is performed by adjusting the position or the index of refraction of the focusing lens within the lens constituting the optical system 5b, and it is configured to adjust the focusing position (position where it is focused) by the focusing lens. The AF mechanism 5c is also connected to the control unit 29 and is controlled by an AF control part 29a of the control unit 29.

[Structure of Display Part 6]

The display part 6 is made of, for example, an organic EL display, a liquid crystal display, etc. The display part 6 is connected to the control unit 29 and can display the images taken by the imaging part 5, the codes of images taken by the imaging part 5, character strings which are the decoding results of the codes, success rate of reading, matching level, recommended separation distance, etc. The success rate of reading means an average of success rate of reading when the reading process is executed multiple times. This is the score which indicates easiness of decoding processing of codes by the decoding part 31. Further, the matching level means a reading margin which indicates easiness of reading codes which are successfully decoded. This is also the score which indicates easiness of decoding processing by the decoding part 31. The matching level can be calculated from the number of error corrections, etc. which occur at the time of decoding, and it may be expressed by, for example, values. The less error corrections there are, the matching level (reading margin) becomes higher. On the other hand, the more error corrections there are, the lower the matching level (reading margin) becomes.

The "recommended separation distance" (it is also called as "recommended installation distance") means the recommended separation distance between the optical information reading device 1 and a code. Specifically, it can be said that this is the distance between the lens surface of the optical system 5b of the optical information reading device 1 and the code which is targeted as an imaging object. The recommended separation distance may be the distance between an imaging face of the imaging element 5a of the optical information reading device 1 and the code, or may be the distance between a specific part on the front face of the optical information reading device 1 and the code.

[Structure of Cell Size Setting Part 30]

The optical information reading device 1 has a cell size setting part 30 which sets a size of cell which constitutes a code on an image obtained by the imaging part 5. The cell size setting part is configured to calculate and set an actual (real) cell size based on the code included in the image taken by the imaging part 5, a distance from the imaging part 5 to the code, and the first characteristic information (e.g., a viewing angle of the optical system 5) which determines a visual field range of the imaging part 5 in response to the distance from the imaging part 5 to the code. The distance from the imaging part 5 to the code can be obtained by a distance setting part 29d. The calculation procedure (setting procedure) of the cell size will be described in detail based on the flowchart described later.

[Structure of Decoding Part 31]

The optical information reading device 1 has a decoding part 31 which detects a position of a code included in an image taken by the imaging element 5a, and performs a decoding processing to the detected code. Specifically, the decoding part 31 is configured to decode black and white binarized data. For decoding, a table which indicates a comparison of relationship of coded data can be used.

Further, the decoding part 31 checks whether or not the decoding data is proper in accordance with a predetermined check system. When an error is found in the data, the proper data is computed by using an error correction function. The error correction function differs depending on the types of code.

The decoding part 31 is configured to write the decoding results, which are obtained by decoding the codes, in the storage device 35. Further, in the decoding part 31, an image processing such as various types of image processing filters, etc. is performed to the images before the decoding.

In order to detect a position of a code, which is included in an image taken by the imaging element 5a, the decoding part 31 searches the code in the image taken by the imaging element 5a. After the code has been searched, for example, a central part of the found code is estimated, and the X-coordinate and the Y-coordinate of its central part are calculated. The method for detecting the position of the code is not limited to this example. For example, the X-coordinate and Y-coordinate of an end part of the code may be calculated.

[Structure of Communication Part 32]

The optical information reading device 1 has a communication part 32. The communication part 32 is the part where the communication is performed with the computer 100 and the PLC 101. The communication part 32 may be provided with an I/O part connected with the computer 100 and the PLC 101, a serial communication part such as RS232C, etc., and a network communication part such as a wireless LAN, a wired LAN, etc.

[Structure of Control Unit 29]

The control unit 29 show in FIG. 11 is the unit for controlling each part of the optical information reading device 1, and may be provided with a CPU or MPU, a system SI, a DSP or an exclusive hardware, etc. The control unit 29 provides various functions which will be described later, and these functions may be performed by a logical circuit, or may be performed by executing a software.

The control unit 29 is provided with an AF control part 29a, an imaging control part 29b, a tuning part (imaging condition setting part) 29c, a distance setting part 29d, a recommended separation distance determination part 29e, and an UI managing part 29e. The AF control part 29a is the unit which controls the AF mechanism 5c, and it is configured to perform focusing of the optical system 5b by the conventionally well-known contrast AF or the phase difference AF. The AF control part 29a is configured that a position in an optical axis direction of the focusing lens, which constitutes the optical system 5b, can be obtained. Specifically, based on the number of steps of the motor for AF or the rotation amount, it becomes possible to obtain an adjustment amount of the focusing lens by the AF mechanism 5c. Further, in a case of a liquid lens which is focused by changing the refractive index, it becomes possible to obtain the adjustment amount of the focusing lens by voltage, etc. which is applied to the liquid lens.

The imaging control part 29b is the unit which controls a gain applied to an image taken by the imaging element 5a to be a predetermined value, which controls light amount of the illumination part 4 to be predetermined light amount, and which controls an exposure time (shutter speed) of the imaging element 5a to be a predetermined time. Here, the gain includes an amplification factor (analog gain), which applies to the imaging element 5a, and an amplification factor (digital gain) in a case in which a brightness of an image outputted from the imaging element 5a is amplified by a digital image processing. It is configured to adjust both factors, but it is also possible that only one of the factors may be adjusted. Regarding the light amount of the illumination part 4, it can be changed by separately controlling the first light emitting diodes 16 and the second light emitting diodes 17. The gain, the light amount of the illumination part 4, and the exposure time are the imaging condition of the imaging part 5.

The tuning part 29c is the unit that is used for the optimization by changing the imaging condition such as the gain, the light amount of the illumination part 4, and the exposure time, etc., and changing an image processing condition. The image processing condition means that when there is coefficient of image processing filters (strength/weakness of image processing filter), or when there is a plurality of image processing filters, a selection of the image processing filter, a combination of different types of image processing filters, etc. A proper imaging condition and a proper image processing condition differ depending on external light effect to the workpieces W at the time of conveyance, colors and materials, etc. of the surface where a code is attached. Therefore, the tuning part 29c searches more proper imaging condition and image processing condition, and sets the processes performed by the AF control part 29a, the imaging control part 29b, and the decoding part 31. For the image processing filters, other than an expansion filter, a shrink filter, and a smoothing filter, and various types of conventionally well-known filters can be used.

The tuning part 29 is configured to calculate an upper limit of the exposure time of the imaging part 5 as a restriction condition for reading the code attached to the workpiece W based on the moving speed of the workpiece W (it is also called as a conveyance speed) and the cell size of the code which is set by the cell size setting part 30. Further, it is configured to set the exposure time of the imaging part 5 within the range of the restriction condition by analyzing a plurality of images, which includes the code and is obtained by taking images multiple times while changing the exposure time of the imaging part 5, so that it can be function as an imaging condition setting part of the present invention. It is preferable that the tuning part 29c is configured to take images of the code by the imaging part 5 multiple times while changing the exposure time within the restriction condition (less than the upper limit of the exposure time). Accordingly, unnecessary attempts can be reduced.

Regarding the moving speed of the aforementioned workpieces W, a value inputted by the user can be used. The moving speed of the workpieces W can be inputted by the operations of the select button 11 and the enter button 12, or by the operations of an input part 43 (e.g., ten-key or mouse, etc.) of the computer 100 shown in FIG. 12. In a case in which the information is inputted by the operations of the input part 43 of the computer 100, the input part 43 of the computer 100 can be a part of the component elements of the optical information reading device 1.

Further, the tuning part 29c may be configured to set the gain by analyzing a plurality of images obtained by taking images by the imaging part 5 multiple times while changing the gain. In addition, the tuning part 29c may be configured to control the imaging part 5 to set the exposure time and the gain by analyzing the plurality of images obtained by taking images multiple times while changing both of the exposure time and the gain.

A distance setting part 29d is the part which obtains a distance from the imaging part 5 to the code. The distance from the imaging part 5 to the code may be the distance between the lens surface of the optical system 5b, which constitutes the imaging part 5, and the code. Further, the distance from the imaging part 5 to the code may be the distance between the imaging face of the imaging element 5a and the code.

As a specific method for obtaining the distance from the imaging part 5 to the code, it may be the following method. For example, there is a method in which the distance setting part 29d obtains an adjustment amount of the focusing lens by the AF mechanism 5c when the focusing by the focusing lens is completed, and based on a correspondence relation between the adjustment amount and the distance from the imaging part 5 to the code, the distance from the imaging part 5 to the code is obtained. That is, when the distance from the imaging part 5 to the code is changed, the position of the focusing lens and the refractive index are adjusted in order to perform focusing, so that it can be said that it is in the correspondence relation between the adjustment amount of the focusing lens by the AF mechanism 5c and the distance from the imaging part 5 to the code. Therefore, by storing the correspondence relation between the adjustment amount of the focusing lens by the AF mechanism 5c and the distance from the imaging part 5 to the code in a correspondence relation storage part 35e, based on the aforementioned adjustment amount when the focusing by the focusing lens is completed, and the aforementioned correspondence relation, the distance from the imaging part 5 to the code can be easily and accurately obtained.

Figure 12:
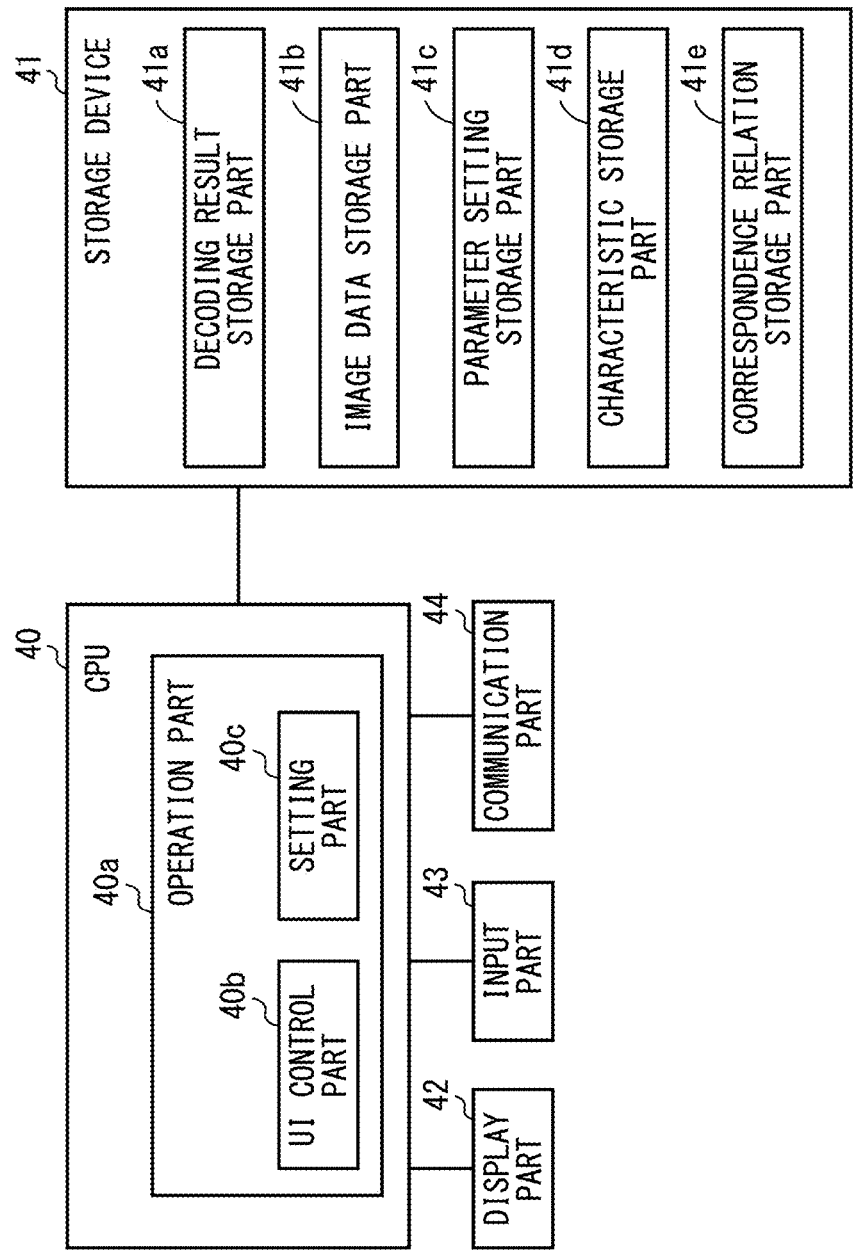
FIG. 12 is a block diagram of a computer.

Further, as another method for obtaining a distance between the imaging part 5 to the code, for example, there is a method in which a value, which is manually inputted by the operations of the select button 11, the enter button 12, the input part 43 of the computer 100 shown in FIG. 12 by the user, can be read. In this case, the distance from the imaging part 5 to the code may be measured by the user in advance.

A recommended separation distance determination part 29e is configured to calculate a recommended separation distance between the optical information reading device 1 and a code based on the second characteristic information, which determines a focusing range in response to the separation distance from the imaging part 5, the cell size set by the cell size setting part 30, and variation information related to a variation width of the distance from the imaging part 5 to the code. The recommended separation distance between the optical information reading device 1 and the code is, in other words, a recommended installation distance of the optical information reading device 1. It is the index which specifically indicates whether the code can be read in a predetermined success rate of reading based on how much the distance between the optical information reading device 1 and the code goes farther or the code can be read in a predetermined success rate of reading based on how much the distance between the optical information reading device 1 and the code goes closer.

A specific method for calculating the recommended separation distance will be described based on a flowchart described later. The recommended separation distance calculated by the recommended separation distance determination part 29e can be displayed in the display part 6 or in the display part 42 of the computer 100. When it is displayed in the display part 42 of the computer 100, the display part 42 can be a part of the component elements of the optical information reading device 1.

A focusing range in a state that the focusing lens of the optical system 5c of the imaging part 5 is fixed in a predetermined position, that is, the focusing range (it is also called as "depth of field" or it is just called as "depth") has already been determined, and the depth is changed depending on the separation distance between the imaging part 5 and the code. The second characteristic information is the information related to the depth which is determined in response to the separation distance from the imaging part 5, and it is unique to the optical system 5c. The second characteristic information can be obtained by performing a test, etc. in advance. By using the second characteristic information, once the separation distance from the imaging part 5 has been determined, it is possible to calculate the depth in the aforementioned separation distance. Further, the depth may be calculated by a predetermined calculation.

Further, the variation width of the distance from the imaging part 5 to the code becomes greater when various types of the workpieces W, e.g., different shapes, are conveyed by the belt conveyer for conveyance B. When the shape of the workpieces W is different, the distance from the imaging part 5 to the code is different in each of the shape of the workpiece, so that the distance from the imaging part 5 to the code varies. The information related to such variation width can be obtained in advance by the method in which the outer dimension of the workpieces W is measured by the user, the actual distance between each workpiece W and the imaging part 5 is measured, etc. Further, when the same shape of the workpieces W is conveyed in the same posture, the variation of the distance from the imaging part 5 to the code is very little, so that the variation width becomes almost zero. For the information related to the variation width, for example, the user can manually input by the operations of the select button 11, the enter button 12, the input part 43 of the computer 100 shown in FIG. 12.

The UI managing part 29e shown in FIG. 11 is the unit which controls the display part 6 to display various user interfaces, codes of images taken by the imaging part 5, character strings which are the decoding results of the codes, success rate of readings, matching level, etc., and which receives inputs from the select button 11 and the enter button 12, and which controls the indicator 9 to turn on.

[Structure of Storage Device 35]

The storage device 35 is configured by a memory, a hard disk, etc. In the storage device 35, a decoding result storage part 35a, an image data storage part 35b, a parameter setting storage part 35c, a characteristic information storage part 35d, and a correspondence relation storage part 35e are provided.

The decoding result storage part 35a is the part storing decoding results which are the results decoded by the decoding part 31. The image data storage part 35b is the part storing images which are taken by the imaging element 5a.

The parameter setting storage part 35c shown in FIG. 11 is the part storing the setting information, which has been set by the setting device such as the computer 100, etc., and the setting information which has been set by the select button 11 and the enter button 12, etc. In the parameter setting storage part 35c, a parameter setting including a plurality of parameters, which constitutes at least one of the imaging condition of the imaging part 5 (a gain, light amount of the illumination part 4, and an exposure time, etc.) and the image processing condition (types of image processing filter, etc.), can be stored. In this embodiment, it is configured to store a plural ways of parameter settings, in which parameters constituting the imaging condition of the imaging part 5 and parameters constituting the image processing condition are combined, so as to display as banks 1 to 5 in the parameter setting display format 46 shown in FIG. 13. It is possible to store different parameter settings in banks 1 to 5, so as to cope with, for example, even a case in which the workpieces W are different, etc. Any number of banks can be set.

Figure 13:
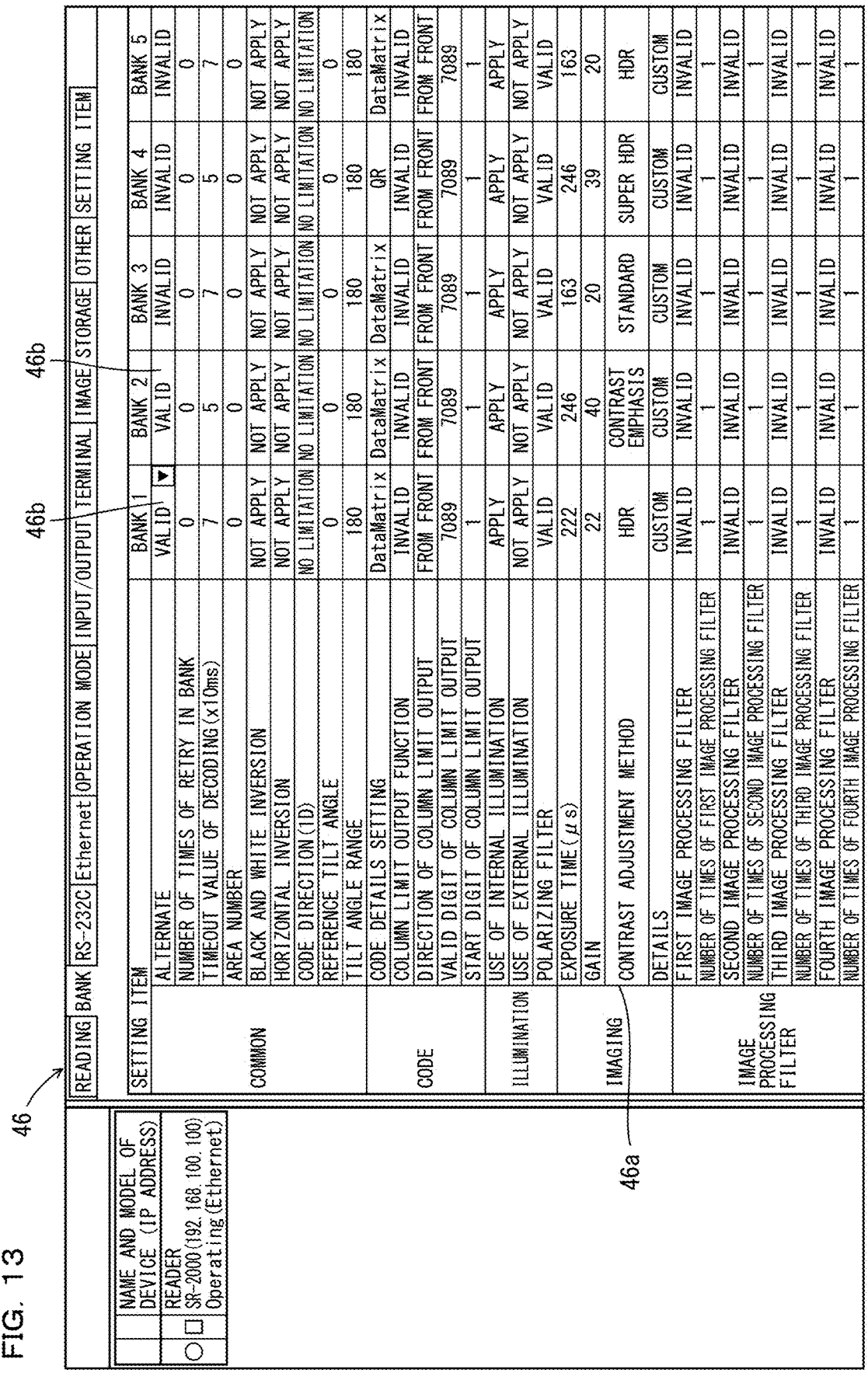
FIG. 13 is a graph showing an effect of contrast emphasis characteristics.

In the optical information reading device 1, it is configured to switch from one parameter setting to another parameter setting among the plurality of parameter settings stored in the parameter setting storage part 35c. The switching of the parameter settings may be performed by the user, or it may be performed by a switching signal from the external control device such as PLC 101, etc. When the user performs the switching of the parameter settings, the user can operate the parameter setting switching part 46b which is incorporated in the user interface as shown in FIG. 13. By setting the parameter setting switching part 46b to be "valid", the parameter setting of the bank is used at the time of operation of the optical information reading device 1, and further, by setting the parameter setting switching part 46b to be "invalid", the parameter setting of the bank is not used at the time of operation of the optical information reading device 1. That is, the parameter setting switching part 46b is used to switch from one parameter setting to another parameter setting. The form of the parameter setting switching part 46b is not limited to the form shown in the drawing. For example, various forms such as a button, etc. may be used.

Here, regarding the parameter setting 46 shown in FIG. 13, a supplementary explanation is added. In FIG. 13, as the "common" parameter, an "alternate" (functions which performs imaging/decoding while automatically switching the plural registered parameter settings), a "number of times of retry in bank" (number of times of imaging/decoding until performing "alternate"), etc. are included. As the "code" parameter, a "code details setting" (code type for performing reading), a "column limit output function" (function which limits output column of reading data), etc. are included. As the "illumination" parameter, an "use of internal illumination" (use or non-use of illumination which is incorporated in the optical information reading device 1), an "use of external illumination" (use or non-use of illumination which is externally mounted to the optical information reading device 1), and a "polarizing filter" (whether or not activating a polarization mode, which will be described later) are included. As the "imaging" parameter, an "exposure time" (exposure time µs at the time of taking images), a "gain" (gain at the time of taking images) and a "contrast adjustment method" (any of the aforementioned "HDR", "super HDR", "standard characteristic" and "contrast emphasis characteristic") are included. Further, as the "image processing filter" parameter, a "first image processing filter" (type of the first executing image filter), a "number of times of the first image processing filter" (number of times of executing the first image filter), etc. are included.

In FIG. 13, in banks 1 to 5, the aforementioned "contrast adjustment method" is set in "HDR", "contrast emphasis", "standard", "super HDR", "HDR", respectively. Further, for the aforementioned "alternate", only bank 1 and bank 2 become "valid". Accordingly, first, the optical information reading device 1 attempts decoding by using the contrast adjustment method "HDR" which is the setting content of bank 1. When the decoding fails, it switches from the setting content of bank 1 to the setting content of bank 2, and attempts decoding by using the contrast adjustment method "contrast emphasis" which is the setting content of bank 2. That is, by attempting the decoding while automatically switching the plural registered parameter settings, it can attempt decoding while automatically switching the contrast adjustment methods, and the reading accuracy can be enhanced.

As the order of the aforementioned "alternate", various methods can be considered. For example, as described above, the decoding may be attempted by switching the banks in order from $1^{st}$ bank. Other than that, for example, the bank in which the reading has been successful may be prioritized. Specifically, regarding the bank in which the reading has been successful, it may be set preferentially for the next reading. Accordingly, for example, when the printing state changes in a lot unit, the reading tact can be shortened.

The characteristic information storage part 35d shown in FIG. 11 stores the first characteristic information, which determines a visual field range (it is also said "visual field size") of the imaging part 5 in response to the distance from the imaging part 5 to the code, and the second characteristic information, which determines a focusing range in response to the aforementioned separation distance from the imaging part 5. The first characteristic information is the information which can determine the visual field range of the imaging part 5 in response to the distance from the imaging part 5 to the code, so that it may be, for example, a viewing angle (rad) of the optical system 5b. Since the second characteristic information is unique to the optical system 5c, it is obtained in advance, and it may be stored in the characteristic information storage part 41 as a form such as a correspondence table which indicates a relationship between the separation distance from the imaging part 5 and the depth.

The correspondence relation storage part 35e is the part which stores the correspondence relation between the adjustment amount of the focusing lens by the aforementioned AF mechanism 5c and the distance from the imaging part 5 to the code. Since the correspondence relation between the adjustment amount of the focusing lens by the aforementioned AF mechanism 5c and the distance from the imaging part 5 to the code is unique to the optical system 5c, it is obtained in advance, and it may be stored in the correspondence relation storage part 35e as a form such as a correspondence table between the adjustment amount of the focusing lens and the distance from the imaging part 5 to the code.

[Structure of Computer 100]

As shown in the block diagram of FIG. 12, the computer 100 is provided with a CPU 40, a storage device 41, a display part 42, an input part 43, and a communication part 44. By minimizing the optical information reading device 1, it hardly performs all settings of the optical information reading device 1 by using only the display part 6 of the optical information reading device 1, the buttons 11, 12, etc., so that the computer 100, which is separated from the optical information reading device 1, is prepared, and various settings of the optical information reading device 1 are performed in the computer 100 and the setting information may be transferred to the optical information reading device 1.

Further, the computer 100 and the optical information reading device 1 are connected in a bilaterally communicable state, and a part of the processing of the aforementioned optical information reading device 1 may be performed in the computer 100. It is also possible to be reversed. In this case, a part of the computer 100 becomes a part of the component elements of the optical information reading device 1.

The CPU 40 is the unit which controls each part of the computer 100 based on the programs stored in the storage device 41. The storage device 41 is provided with a memory, a hard disk, etc. The display part 42 is provided with, for example, a liquid crystal display, etc. The input part 43 is provided with a keyboard, a mouse, a touch screen provided in the display part 42, a touch sensor, etc. The communication part 44 is the part which performs a communication with the optical information reading device 1. The communication part 44 may has a serial communication part such as an I/O part, a RS232C, etc. which connects with the optical information reading device 1, and a network communication part such as a wireless LAN, a wired LAN, etc.

The CPU 40 is provided with an operation part 40a which conducts various operations. The operation part 40a is provided with an UI control part 40b and a setting part 40c. The UI control part 40b generates a user interface for setting the imaging condition of the imaging part 5 of the optical information reading device 1, the image processing condition, etc., and a user interface for displaying the decoding results outputted from the optical information reading device 1, image data, etc. It is displayed in the display part 42. The setting part 40c sets the imaging condition of the imaging part 5 and the image processing condition.

The storage device 41 of the computer 100 is provided with a decoding result storage part 41a, an image data storage part 41b, a parameter setting storage part 41c, a characteristic information storage part 41d, and a correspondence relation storage part 41e. These storage parts 41a to 41e are the parts which store the information similar to the decoding result storage part 35a, the image data storage part 35b, the parameter setting storage part 35c, the characteristic information storage part 35d, and the correspondence relation storage part 35e, and it may be a part of the component elements of the optical information reading device 1.

[Executing Steps at the Time of Setting]

Next, the executing steps at the time of setting of the optical information reading device 1 configured as described above will be described based on the flowchart shown in FIG. 14. The following steps may be executed by the control unit 29 of the optical information reading device 1, or may be executed by controlling each part of the optical information reading device 1 in the CPU 40 of the computer 100. In this embodiment, since the tuning part 29c is provided in the control unit 29 of the optical information reading device 1, the tuning step can be executed by the control unit 29.

Figure 14:
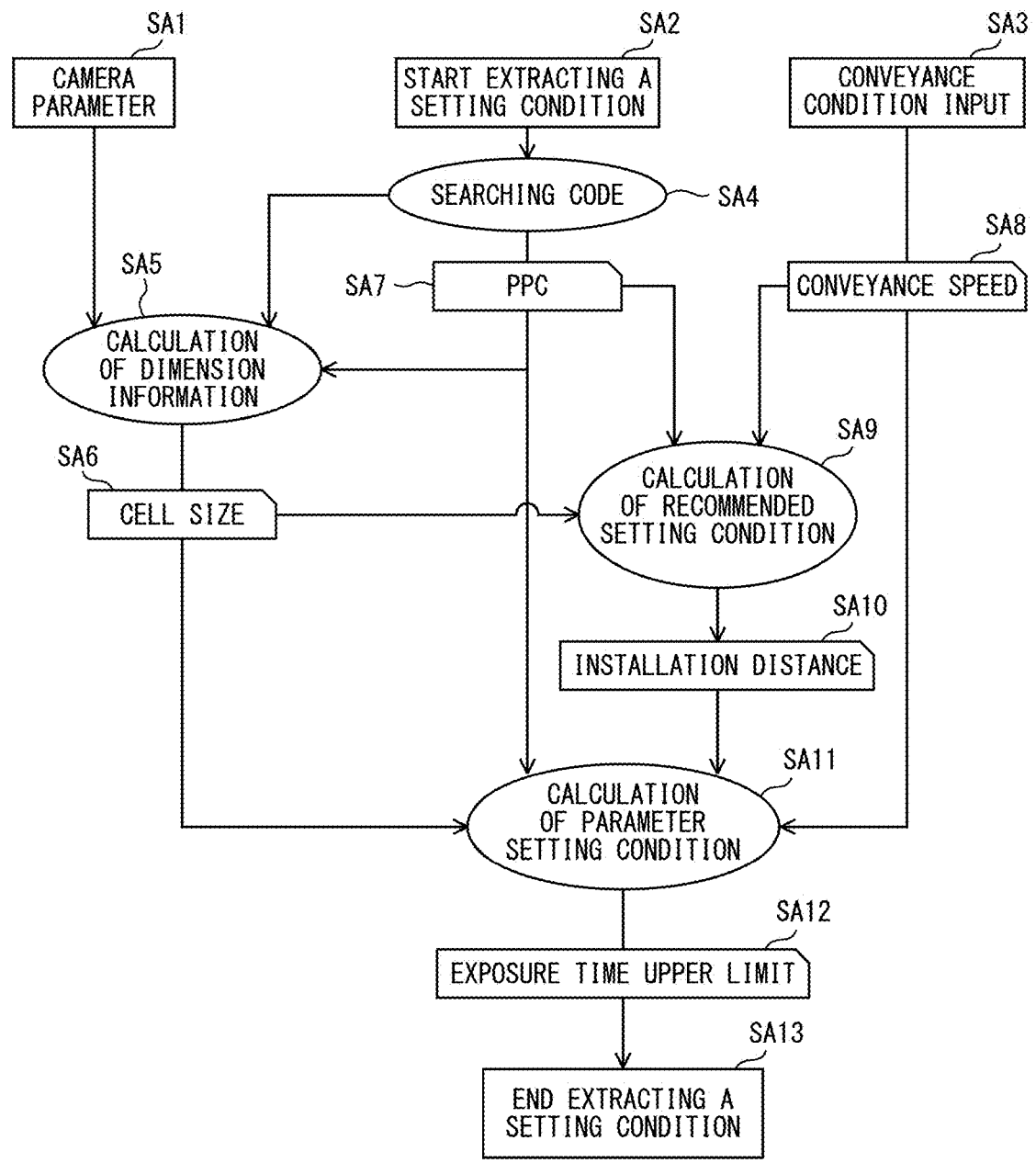
FIG. 14 is a flowchart showing a step for extracting a setting condition.
Figure 15:
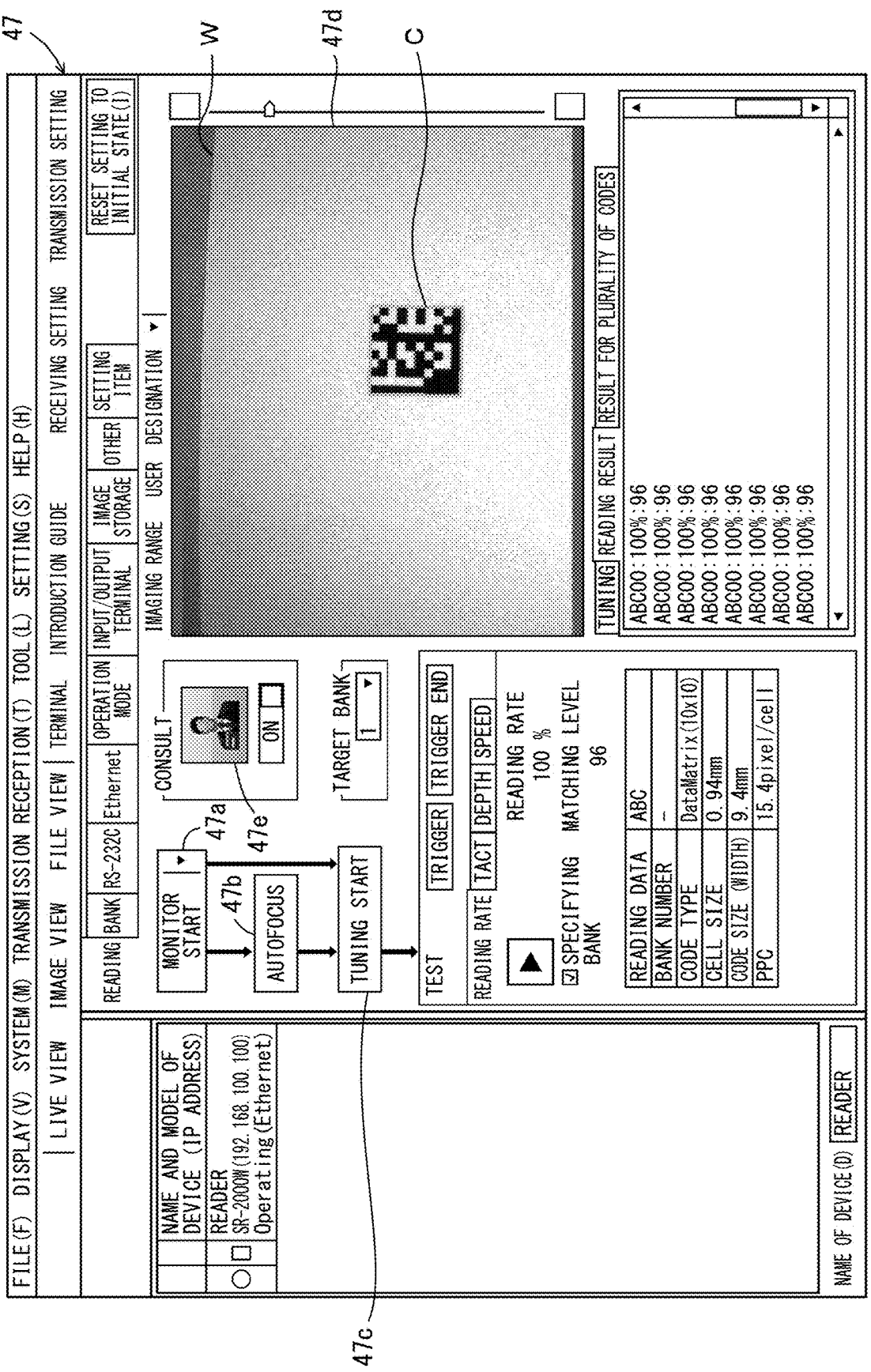
FIG. 15 shows a starting interface.

In Step SA1 of the flowchart shown in FIG. 14, parameters (camera parameter) which are unique to the imaging part 5 are read. The camera parameters can be the parameters which are necessary for specifying an actual size (size of cell which constitutes the code) of the code based on the code on the image obtained by the imaging part 5. In this embodiment, it includes the first characteristic information which determines the visual field range of the imaging part 5 in response to the distance from the imaging part 5 to the code, and the second characteristic information which determines the focusing range in response to the separation distance from the imaging part 5. In a case in which the imaging part 5 is the fixed focusing type, the camera parameters can be the resolution (mm/pixel).

In Step SA2, the extraction of the setting condition starts. In the extraction of the setting condition, first, the UI control part 40b of the computer 100 displays a starting user interface 47 in the display part 42 of the computer 100. In the starting user interface 47, a monitor button 47a, an autofocusing button 47b, a tuning start button 47c, an image display area 47d, and a setting start button 47e are incorporated.

When the user clicks the monitor button 47a by operating the input part 43 of the computer 100, an image which is the current image taken by the imaging part 5 of the optical information reading device 1 is displayed in the image display area 47d. The user moves the workpiece W while watching an image in the starting interface 47 such that a code C of the workpiece W is displayed in the image display area 47d. Further, the tuning can be performed by taking an image of a code attached to a material such as a paper instead of the actual workpiece W.

The button 47a can be operated (pressed) by clicking the monitor button 47a, but for example, when it is the touch panel, the button 47a can be operated by touching the monitor button 47a on the screen. Hereinafter, the "clicking" is just one example of the specific method of the operation, but the operation method is not limited to "clicking".

After that, when the user clicks the autofocusing button 47b of the starting interface 47, the code C is focused by controlling the AF mechanism 5c of the imaging part 5 by the AF control part 29a. In this way, the code C can be confirmed within the image display area 47d, and the fine adjustment of the position is performed by the user by moving the workpiece W while watching the screen of the starting interface 47, and the focusing can be performed. Further, when the user clicks the tuning start button 47c of the starting interface 47, the tuning step is executed.

Figure 16:
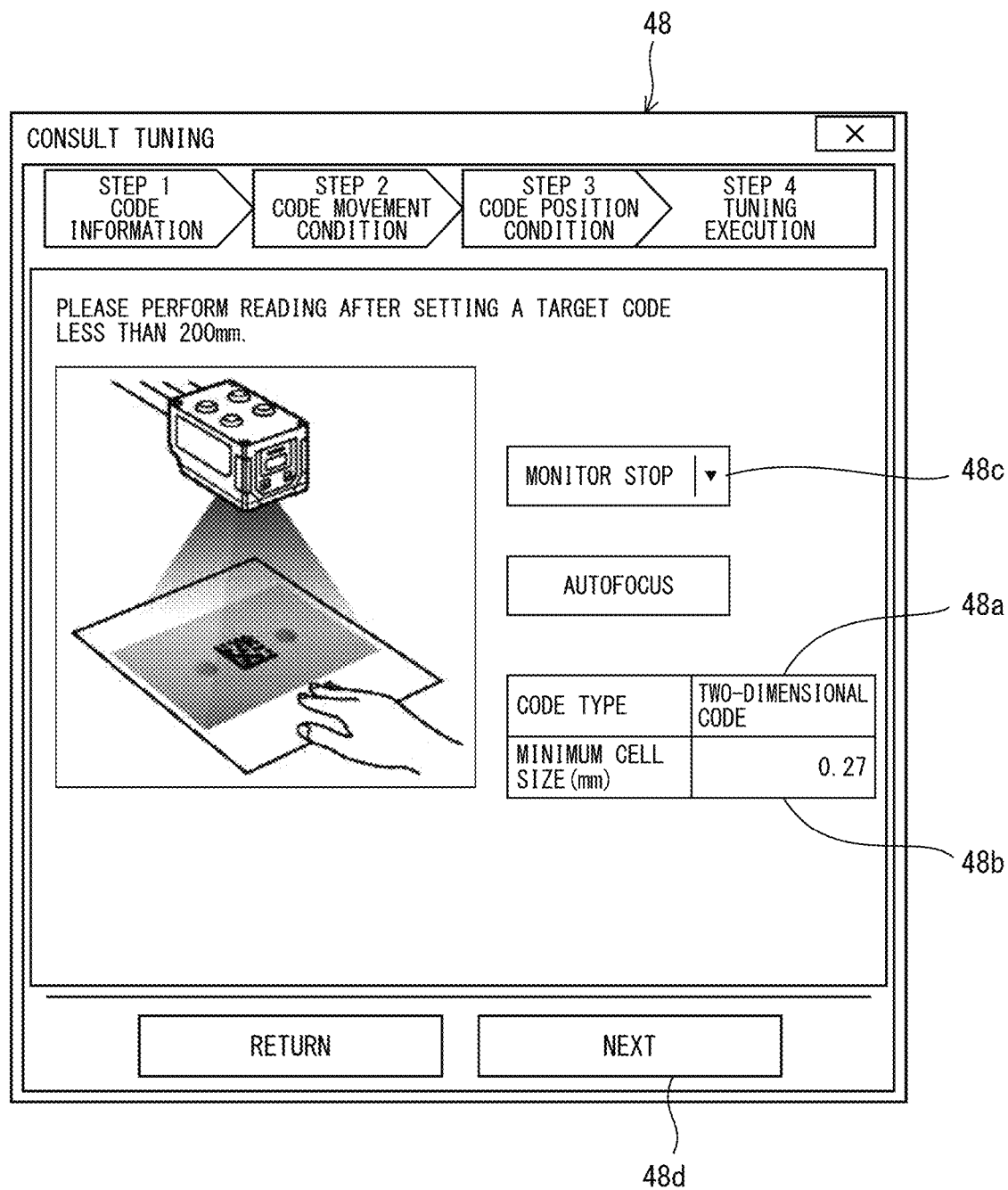
FIG. 16 shows a code information acquisition interface.

Before clicking the tuning start button 47c of the starting interface 47 by the user, when the user clicks the setting start button 47e, the setting wizard starts, and the code information acquisition interface 48 shown in FIG. 16 is displayed in the display part 42 of the computer 100. In the code information acquisition interface 48, an explanatory diagram, which indicates how to position the code, is incorporated.

At the same time when the setting wizard starts, the tuning part 29c controls the imaging part 5 to start the monitoring operation. The monitoring operation means the operation in which the images, which are taken consecutively by the imaging part 5 of the optical information reading device 1, are sequentially displayed in the image display area 47d, and the illumination part 4 is operated in synchronization with the imaging part 5. When the user stops the monitoring operation, the user can click the stop button 48c of the code information acquisition interface 48.

It proceeds to Step SA4 in the flowchart shown in FIG. 14, and the tuning part 29c searches a code for the decoding processing in the visual field range of the imaging part 5. At this point, it attempts to take images by the imaging part 5 while changing exposure times and gains, etc. in different variations, and at the point in which any code is found by the attempts, the code type is determined.

The determination of the code type means to determine any of the codes such as, for example, bar code, QR code, Micro QR Code, DataMatrix, Veri Code, Aztec Code, PDF417, Maxi Code, etc., but it may just determine any of bar code and two-dimensional code. As the determination results of the code type, it is displayed in a code type display area 48a which is incorporated in the code information acquisition interface 48 shown in FIG. 16. In Step SA7, a value, that is, PPC (pixel per cell) indicating the number of pixels in the image data obtained by the imaging part 5, which corresponds to one cell constituting the code, is calculated. The PPC can be calculated based on the well-known method by using the image data obtained by the imaging part 5, and therefore, the detailed explanation will be omitted.

Figure 17:
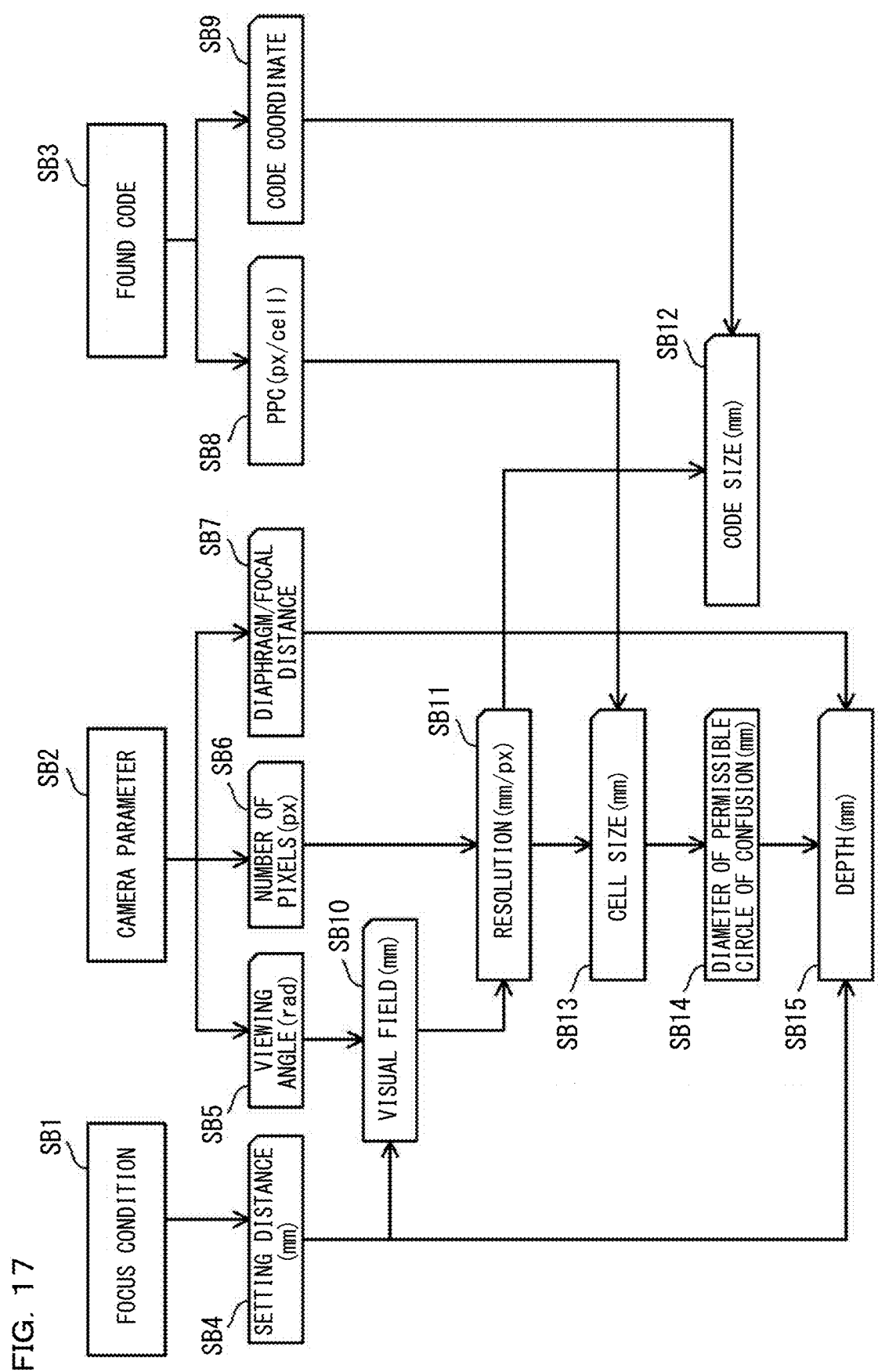
FIG. 17 is a flowchart showing a calculation step of dimension information.

Further, it proceeds to Step SA5, and the dimension information is calculated. The flowchart of the calculation step of the dimension information is shown in FIG. 17. In Step SB1, the focusing condition is read. The focusing condition is the adjustment amount of the focusing lens controlled by the AF mechanism 5c. In Step SB2, the camera parameter is read in a similar manner as Step SA1 in the flowchart shown in FIG. 14. In Step SB3, the code found by the search is read.

In Step SB4, the distance setting part 29d obtains the distance (mm) from the imaging part 5 to the code based on the correspondence relation between the adjustment amount of the focusing lens by the AF mechanism 5c when the focusing by the focusing lens is completed and the distance from the imaging part 5 to the code. It becomes the installation distance at the present time. The user may measure the distance from the imaging part 5 to the code by using a scale, etc., and the user may input the measured value as the installation distance.

In Step SB5, the viewing angle (rad) of the optical system 5b, which has been preliminarily stored, is read. In Step SB6, the number of pixels (pixels) of the imaging element 5a is read in a form of, for example, 1280 pixels in a vertical direction×768 pixels in a horizontal direction. The number of pixels of the imaging element 5a has already been known, so that it is preliminarily stored in the storage device 35. In Step SB7, the information related to the diaphragm and the focal distance of the optical system 5b is read. The diaphragm and the focal distance of the optical system 5b at the present time are outputted to the control unit 29.

In Step SB8, the PPC (pixel per cell) is calculated. In Step SB9, the code coordinate is read. The code coordinate is obtained by estimating, for example, the central part of the code and calculating the X-coordinate and the Y-coordinate at the central part, but it may be the coordinate at the end part of the code.

In Step SB10, a visual field range of the imaging part 5 is calculated. It is possible to calculate the visual field range h in the formula (1):

$$h = 2d \cdot \tan(\theta/2) \quad (1)$$

Here, d represents an installation distance at the present time, and θ represents a viewing angle of the optical system 5b.

In Step SB11, a resolution r, that is, an actual size length, which indicates one pixel constituting image data, is calculated. It is possible to calculate the resolution r in formula (2):

$$\text{resolution}(r) = h/n \quad (2)$$

Here, n represents a number of pixels in a horizontal direction of the imaging element 5a.

In Step SB12, a size of code (code size) is calculated. The code size CS (mm) can be obtained by multiplying the resolution r, which is calculated by formula (2), with the number of pixels in the horizontal direction of the code. The number of pixels in the horizontal direction of the code can be obtained from the image data.

In Step SB13, a size of cell (cell size) is calculated. The word "cell" means a minimum unit in which a code is constituted. The cell size p can be obtained by multiplying the resolution r, which is calculated by formula (2), with the number of pixels in the horizontal direction of the cell. The pixel number in the horizontal direction of the cell can be obtained from the image data. The cell size p is calculated by the cell size setting part 30.

In Step SB14, a diameter of permissible circle of confusion (mm) is set. The diameter of permissible circle of confusion is a limit value of permissible blur amount. That is, when a code is taken while moving a workpiece at high speed, a blur occurs. Even though a little blur occurs, it can be decoded with the error correction function. Here, the blur amount, in which more than a predetermined success rate of reading can be obtained, is set as the maximum permissible blur amount, and the maximum permissible blur amount can be expressed by the diameter of permissible circle of confusion. Further, the diameter of permissible circle of confusion can be expressed by the number of cells which constitute a code. Furthermore, the maximum permissible blur amount is preliminarily calculated, and it can be stored in the storage device 35 of the optical information reading device 1.

In Step SB15, a front depth of field (mm) is calculated from formula (3), and a back depth of field (mm) is calculated from formula (4).

$$\text{Front depth of field } Df=(\delta F d_2)/(f_2+\delta Fd) \tag{3}$$

$$\text{Back depth of field } Db=(\delta F d_2)/(f_2-\delta Fd) \tag{4}$$

Here, F represents a diaphragm of the optical system 5b, and f represents a focal distance of the optical system 5b. Further, δ represents a diameter of permissible circle of confusion.

As described above, when Step SA5 of the flowchart shown in FIG. 14 is completed, the dimension of the code, the visual filed range, the depth, etc. which are necessary for the following calculations can be obtained. In Step SA6 of the flowchart shown in FIG. 14, the cell size p calculated in Step SA5 is read. The cell size p can be displayed as "minimum cell size (mm)" in the cell size display area 48b which is incorporated in the code information acquisition interface 48 shown in FIG. 16. If the cell size, which is displayed here, has an error, the user can correct or manually input for setting.

Figure 18:
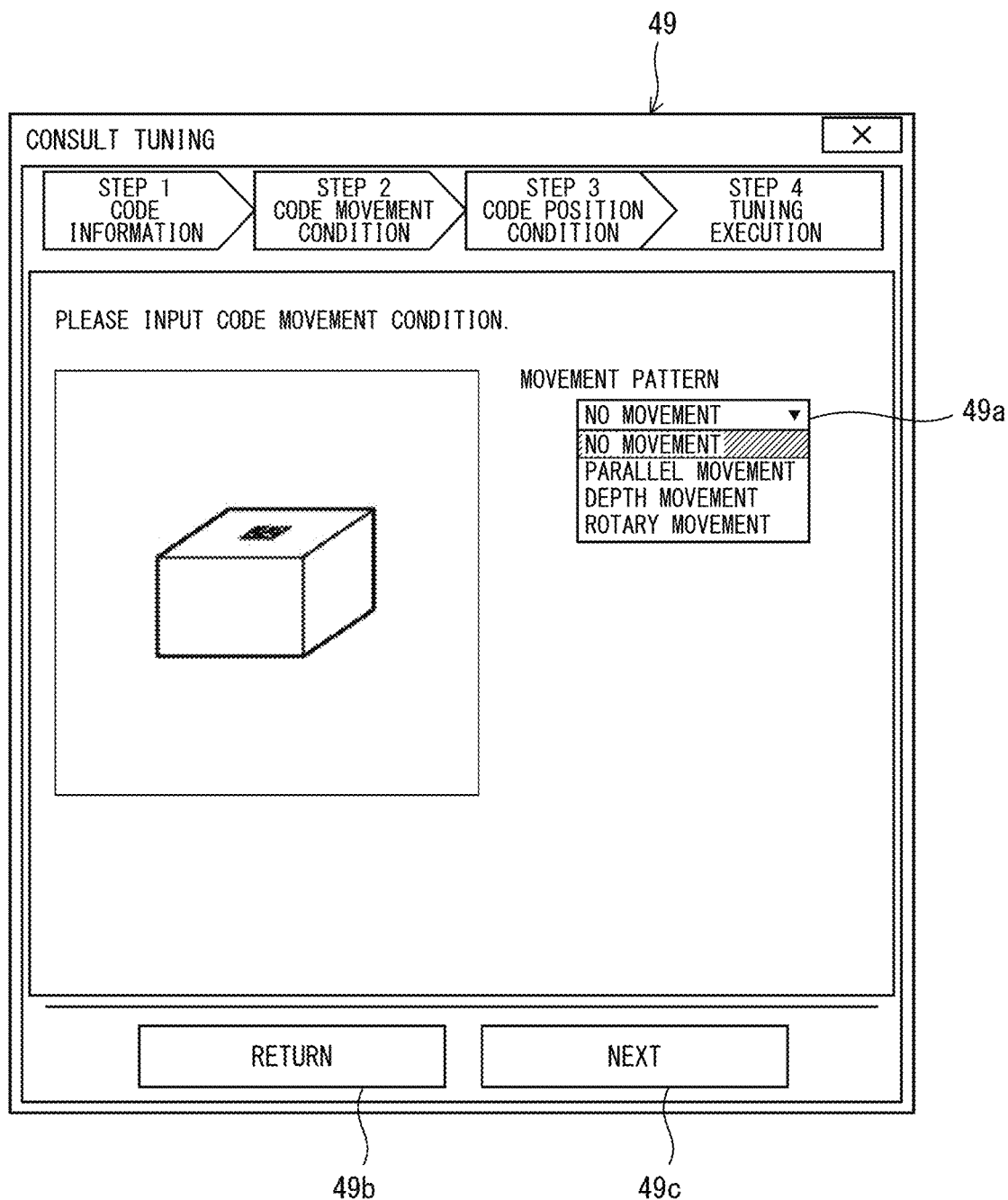
FIG. 18 shows a code movement condition input interface.

On the other hand, in Step SA3 of the flowchart shown in FIG. 14, a conveyance condition is inputted by the user. When "Next" button 48d of the code information acquisition interface 48 shown in FIG. 16 is clicked, a code movement condition input interface 49 shown in FIG. 18 is displayed in the display part 42 of the computer 100. In the code movement condition input interface 49, a pull-down menu button 49a is incorporated. When the pull-down menu button 49a is clicked, as an example of selectable items, "no movement", "parallel movement", "depth movement", and "rotary movement" are displayed, and it is capable of select a desired item.

The item "no movement" is the item which is selected when the workpiece W does not move during the operation (imaging) of the optical information reading device 1. The item "parallel movement" is the item which is selected when the workpiece W moves in the vertical direction or the horizontal direction of the imaging element 5a during imaging. The item "depth movement" is the item which is selected when the workpiece W moves in the depth direction during imaging, that is, in a direction of approaching to the imaging element 5a or in a direction away from the imaging element 5a. The item "rotary movement" is the item which is selected when the workpiece W rotates during imaging.

Figure 19:
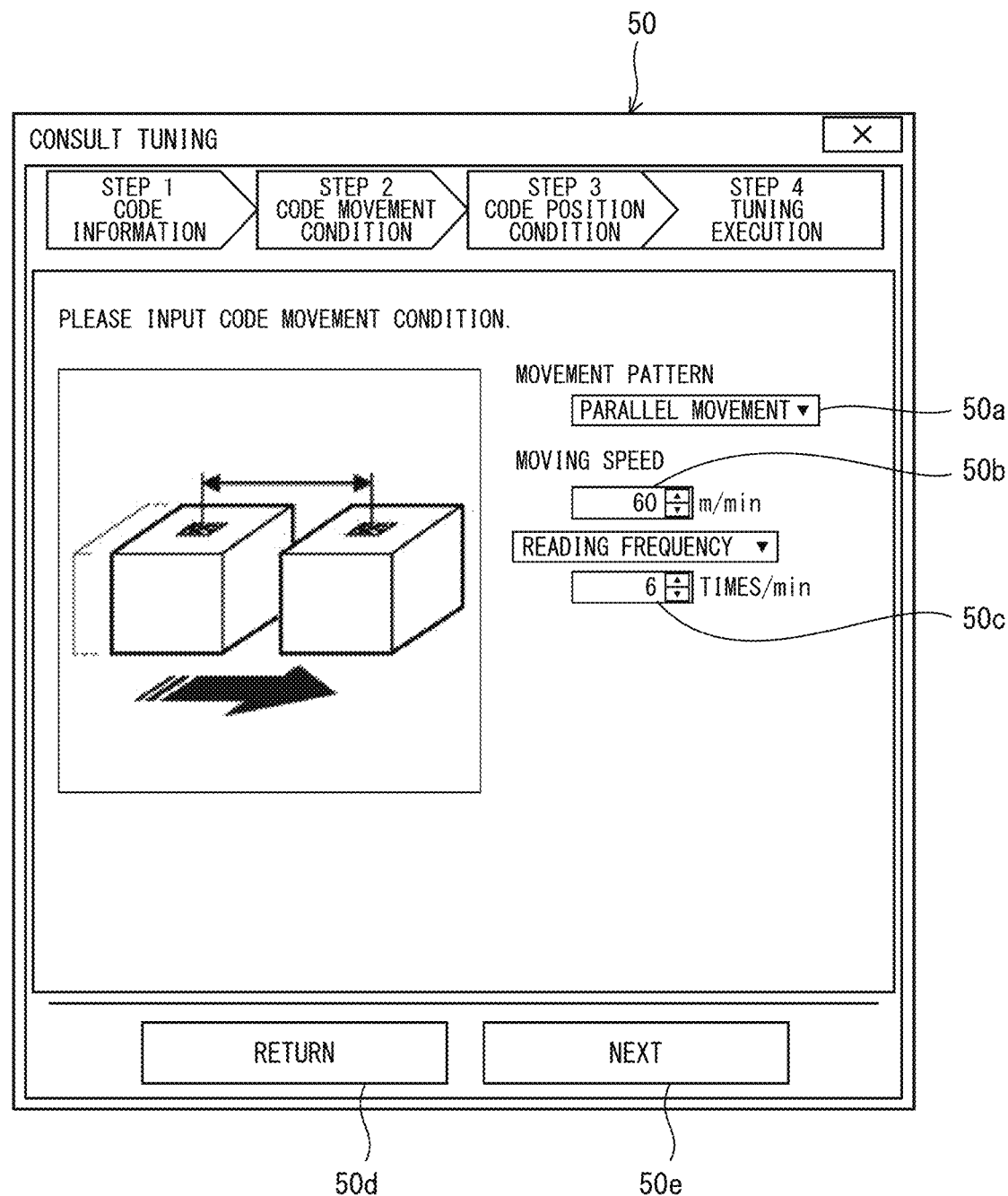
FIG. 19 shows a parallel moving speed input interface.

In the code movement condition input interface 49, a "Return" button 49b and a "Next" button 49c are incorporated, and when the "Return" button 49b is clicked, the code information acquisition interface 48 shown in FIG. 16 is displayed in the display part 42 of the computer 100. On the other hand, for example, when the item "parallel movement" is selected and the "Next" button 49c is clicked, a parallel moving speed input interface 50 shown in FIG. 19 is displayed in the display part 42 of the computer 100. In the parallel moving speed input interface 50, a pull-down menu button 50a, which is similar to the pull-down menu button 49a of the code movement condition input interface 49, is also incorporated.

In the parallel moving speed input interface 50, a conveyance speed input column 50b which is used for inputting a conveyance speed (m/minute) of the workpiece W, and a frequency input column 50c which is used for inputting a reading frequency (times/minute) are incorporated. The conveyance speed of the workpiece W may be, for example, the conveyance speed of the belt conveyer for conveyance B. The reading frequency (times/minute) may be a number of times of code reading in one minute. In the parallel moving speed input interface 50, a diagram which indicates a moving direction of a workpiece is displayed.

Figure 22:
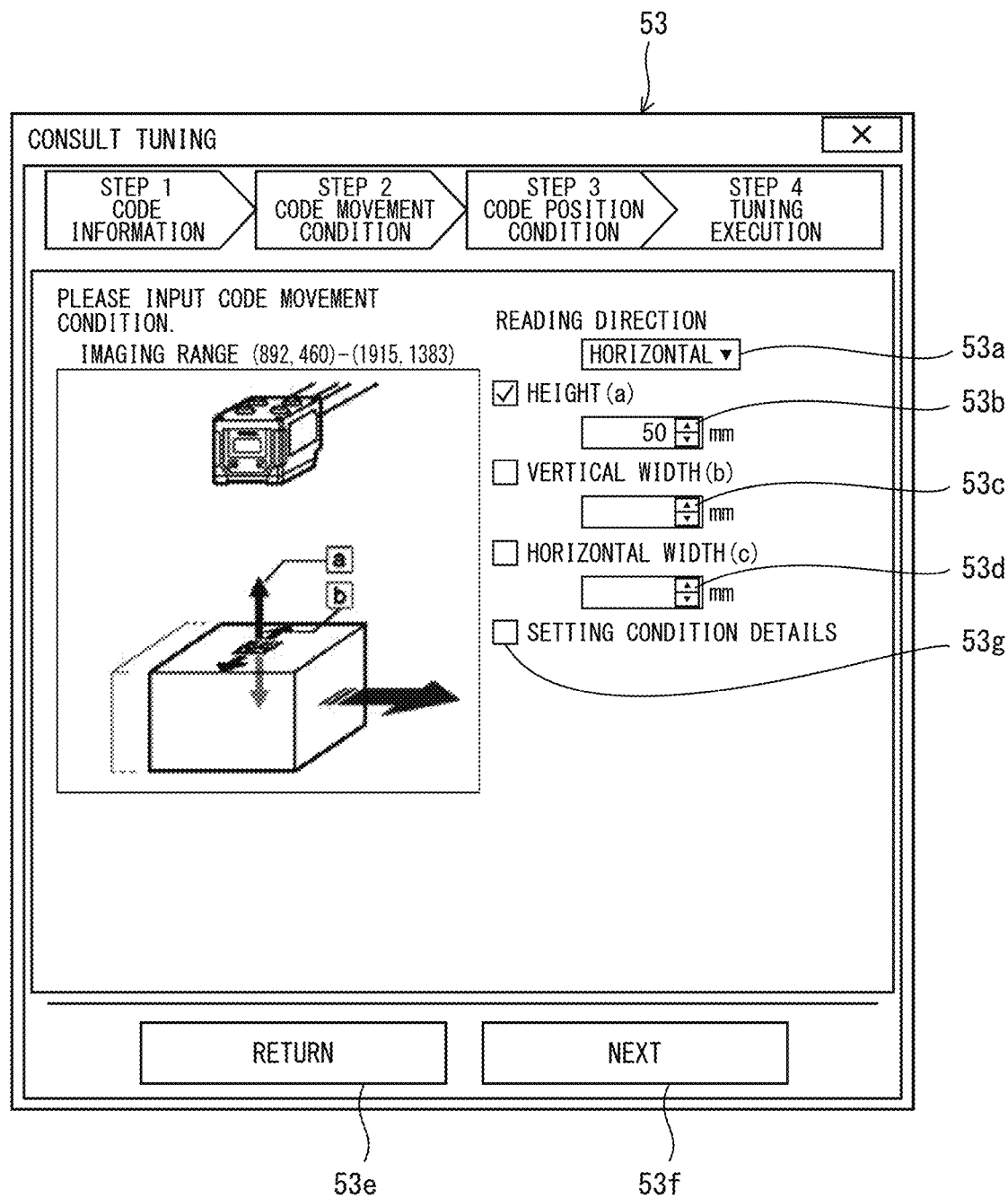
FIG. 22 shows a position condition input interface.

In the parallel moving speed input interface 50, a "Return" button 50d and a "Next" button 50e are incorporated. When the "Return" button 50d is clicked, the code movement condition input interface shown in FIG. 18 is displayed in the display part 42 of the computer 100. On the other hand, when the "Next" button 50e is clicked, the position condition input interface 53 shown in FIG. 22 is displayed in the display part 42 of the computer 100.

Figure 20:
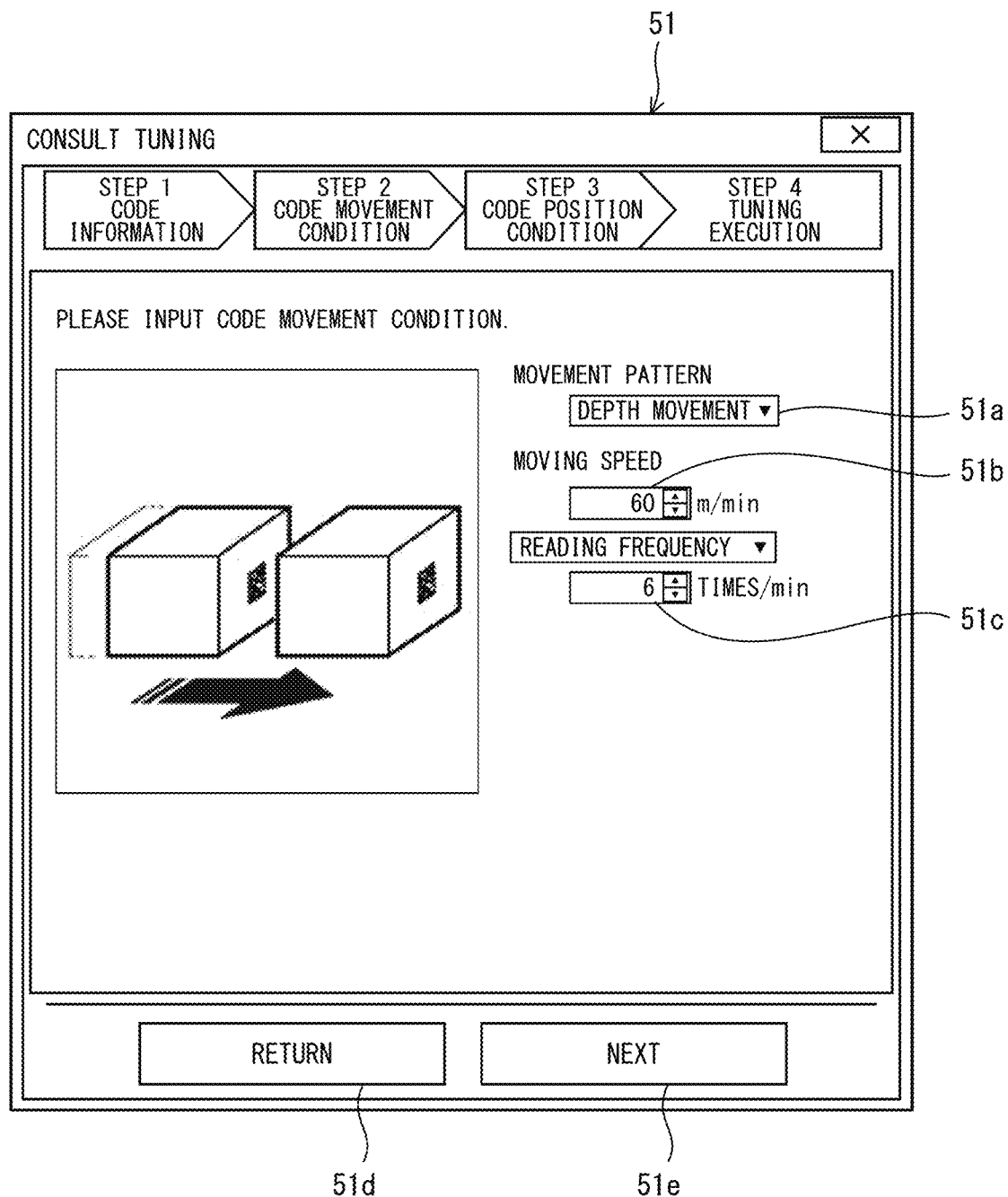
FIG. 20 shows a depth direction moving speed input interface.

When the item "depth movement" is selected in the code movement condition input interface 49 shown in FIG. 18, the depth direction moving speed input interface 51 shown in FIG. 20 is displayed in the display part 42 of the computer 100. Further, in the depth direction moving speed input interface 51, a pull-down menu button 51a, which is similar to the pull-down menu button 49a of the code movement condition input interface 49, is incorporated. In the depth moving speed input interface 51, a conveyance speed input column 51b which is used for inputting a conveyance speed (in/minute) of the workpiece W, and a frequency input column 51c which is used for inputting a reading frequency (times/minute) are incorporated. In the depth direction moving speed input interface 51, a diagram which indicates a moving direction of the workpiece W is also displayed.

In the depth direction moving speed input interface 51, a "Return" button 51d and a "Next" button 51e are incorporated. When the "Return" button 51d is clicked, a code movement condition input interface shown in FIG. 18 is displayed in the display part 42 of the computer 100. On the other hand, when the "Next" button 51e is clicked, a position condition input interface 53 shown in FIG. 22 is displayed in the display part 42 of the computer 100.

Figure 21:
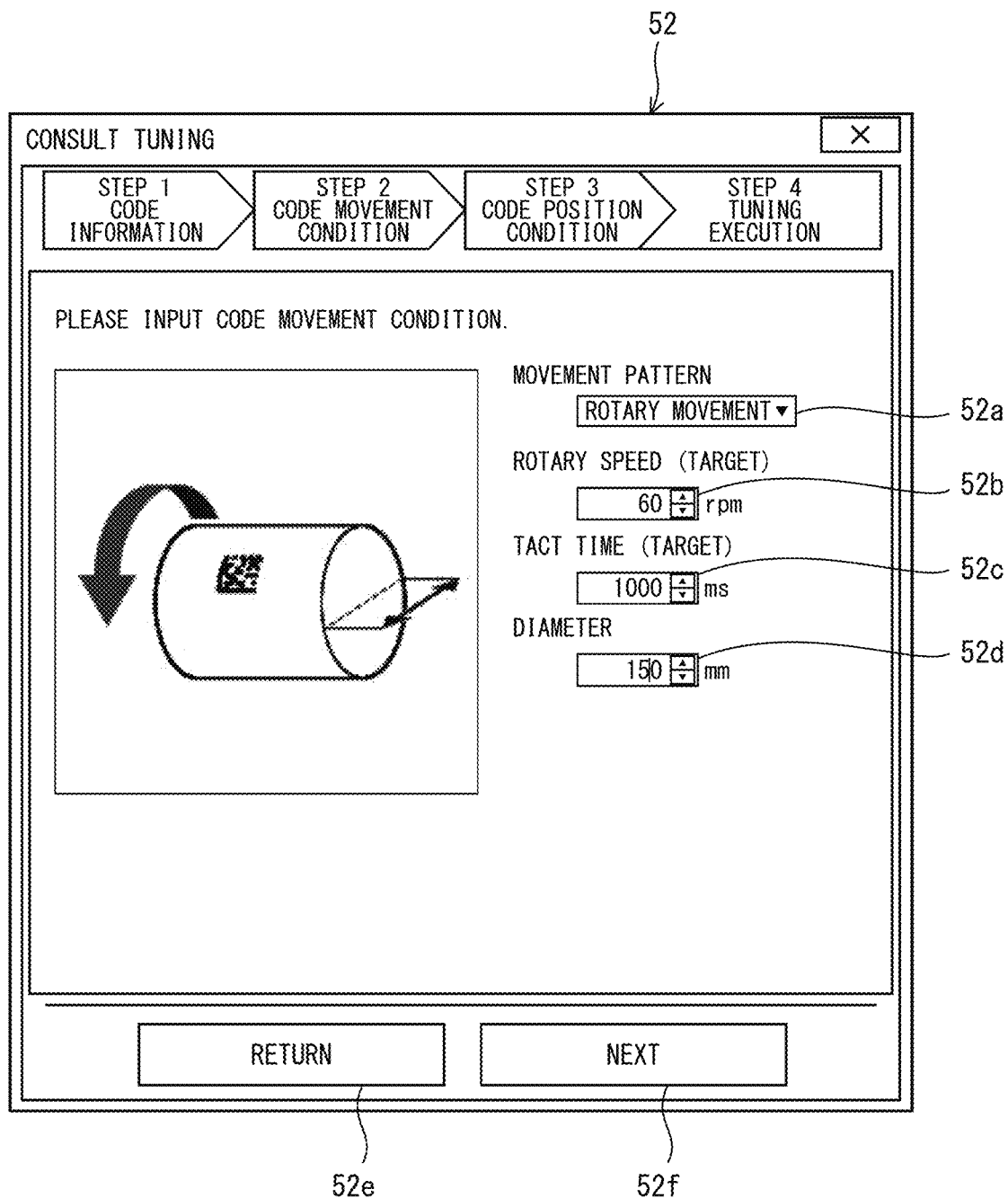
FIG. 21 shows a rotary moving speed input interface.

When the item "rotary movement" is selected in the code movement condition input interface 49 shown in FIG. 18, the rotary moving speed input interface 52 shown FIG. 21 is displayed in the display part 42 of the computer 100. Further, in the rotary moving speed input interface 52, a pull-down menu button 52a, which is similar to the pull-down menu button 49a of the code movement condition input interface 49, is incorporated. In the rotary moving speed input interface 52, a rotation speed input column 52b, which is used for inputting a target rotation speed (rpm) of the workpiece W, a tack time input column 52c, which is used for inputting a tact time (ms), and a diameter input column 52d, which is used for inputting a diameter (mm) of the workpiece W, are incorporated. In the rotary moving speed input interface 52, a diagram which indicates a moving direction of the workpiece is also displayed.

In the rotary moving speed input interface 52, a "Return" button 52e and a "Next" button 52f are incorporated. When the "Return" button 52e is clicked, the code movement condition input interface shown in FIG. 18 is displayed in the display part 42 of the computer 100. On the other hand, when the "Next" button 52f is clicked, the position condition input interface 53 shown in FIG. 22 is displayed in the display part 42.

In the position condition input interface 53 shown in FIG. 22, a selection column 53a which selects a installation direction of the optical information reading device 1, a height variation input column 53b which inputs a height variation (mm) of the optical information reading device 1, a vertical width input column 53c which inputs a vertical width (mm) of the workpiece W, and a horizontal width input column 53d which inputs a horizontal width (mm) of the workpiece W are incorporated. The word "horizontal" in the installation direction of the optical information reading device 1 means that the workpiece W is moved in the horizontal direction with respect to the imaging element 5a in the installation state. The phase "height variation of the optical information reading device 1" means the variation range (variation information) of the separation distance between the optical information reading device 1 and a code. The vertical width of the workpiece W is the dimension in a direction orthogonal to the moving direction of the workpiece W. The horizontal width of the workpiece W is the dimension in the moving direction of the workpiece W.

In the position condition input interface 53, a "Return" button 53e and a "Next" button 53f are incorporated. When the "Return" button 53e is clicked, it is returned to the interface screen which has been displayed immediately before, and on the other hand, when the "Next" button 53f is clicked, it proceeds to the tuning execution screen.

Figure 23:
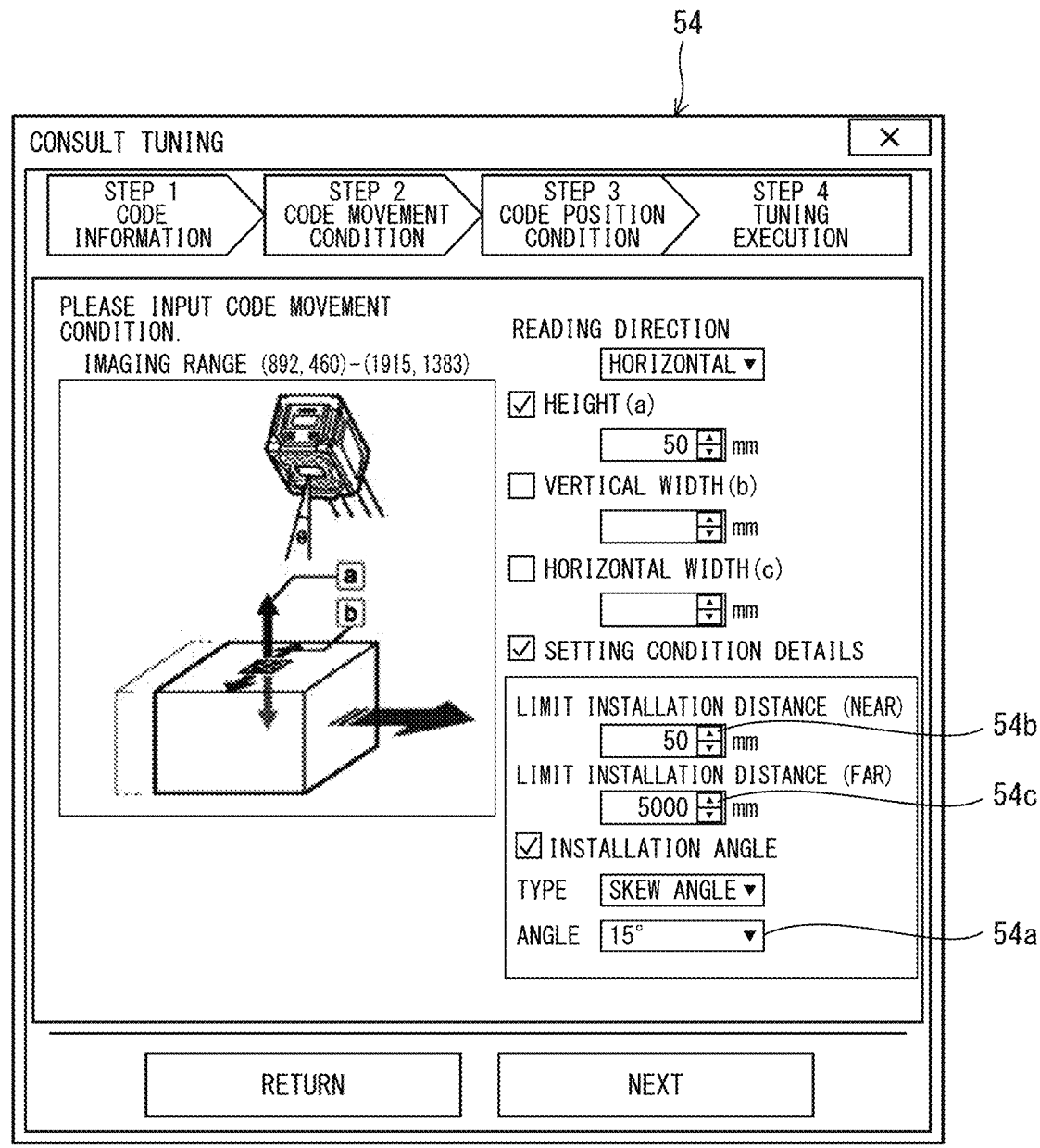
FIG. 23 shows a detail installation condition input interface.

Further, as shown in FIG. 23, a detail installation condition input interface 54 can be displayed. In the detail installation condition input interface 54, an angle input column 54a is incorporated so as to input an installation angle when the optical information reading device 1 is obliquely installed so that the optical axis of the optical system 5b of the optical information reading device 1 and the surface of the workpiece W on which a code is attached are not orthogonal to each other. That is, in a case in which a code is attached to a glossy surface, generally, the optical information reading device 1 is obliquely installed in order to prevent an image from white halation, so that a calculation which considers the angle can be performed by inputting the angle at the time of the installation, and the visual field range or the depth can be calculated more precisely.

Further, in the detail installation condition input interface 54, a limit installation distance (near) input column 54b, which inputs a near limit distance (mm) when the workpiece W and the optical information reading device 1 are close to each other, and a limit installation distance (far) input column 54c, which inputs a far limit distance (mm) when the workpiece W and the optical information reading device 1 are greatly away from each other, are incorporated.

Figure 24:
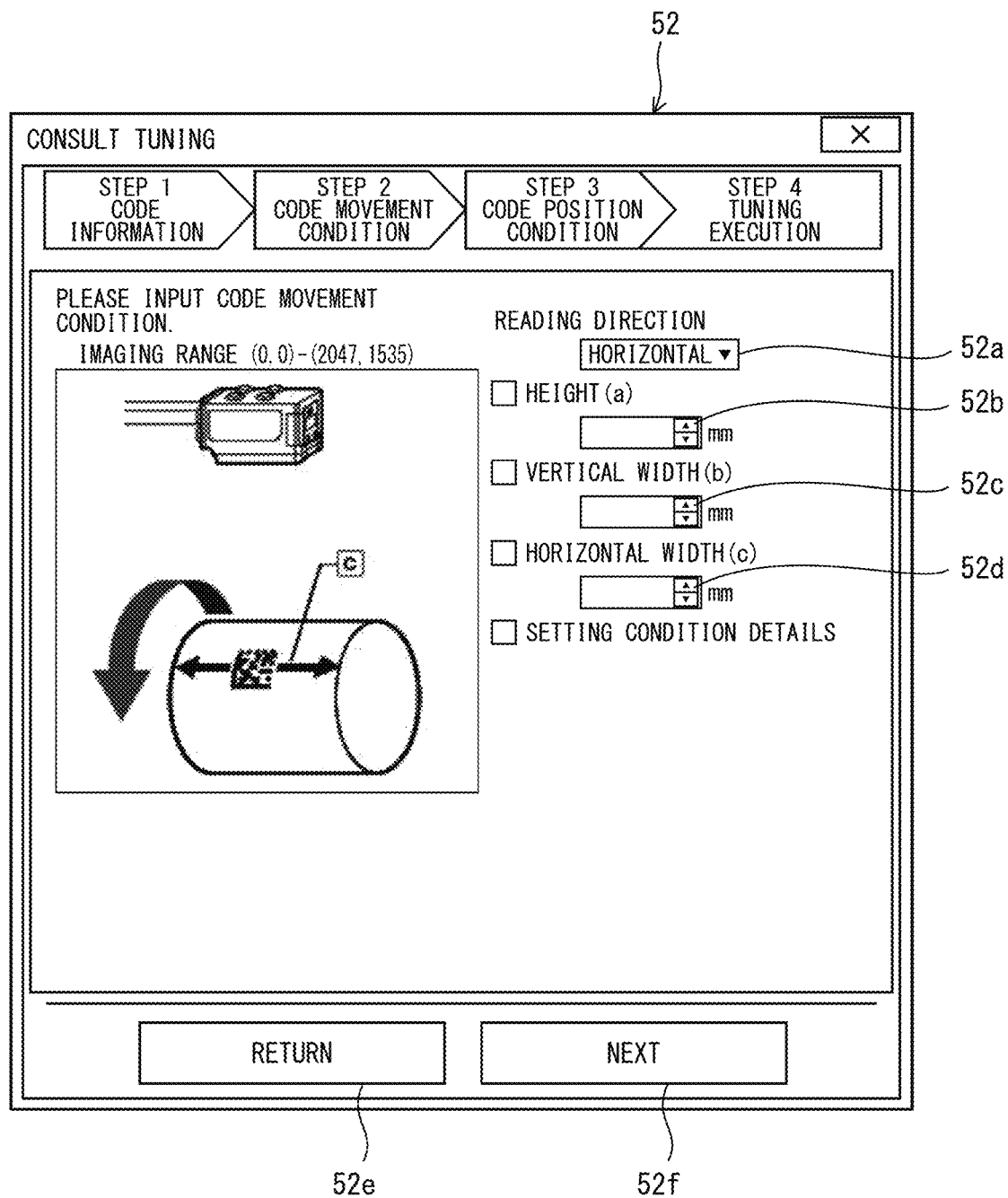
FIG. 24 is a diagram showing a different example of rotary moving speed input interface.

Further, as shown in FIG. 24, an interface corresponding to an installation state of the optical information reading device 1 which is inputted by the user may be displayed in the display part 42 of the computer 100.

Figure 25:
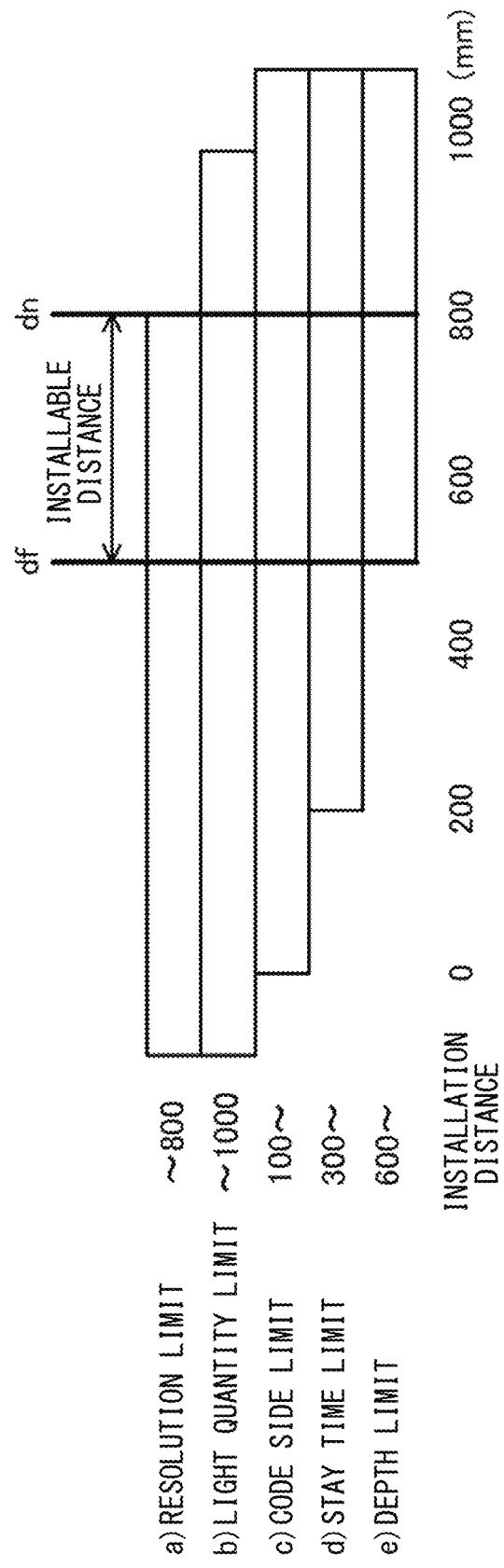
FIG. 25 is an explanatory diagram showing a way to determine an installable distance.

As described above, the user inputs a conveyance condition in Step SA3 of the flowchart shown in FIG. 14. After that, in Step SA8, among the conveyance conditions which are inputted by the user, for example, the conveyance speed, etc. is read. In Step SA9, a recommended installation condition is calculated. In Step SA9, a recommended separation distance between the optical information reading device 1 and the code is calculated as an installable distance based on the conveyance condition, the time which has been actually required for reading the code, the PPC, etc. For example, each of the following elements for the conveyance condition restricts the installable distance. Specifically, as shown in FIG. 25, there are at least a) an installable distance restricted from a resolution limit, b) an installable distance restricted from a light amount limit, c) an installable distance restricted from a code size limit, d) an installable distance restricted from a stay time limit, and e) an installable distance restricted from a depth limit.

a) The installable distance, which is restricted from the resolution limit, is determined because it is impossible to read the code when it falls below the PPC, in which the code taken as an image is readable. b) The installable distance, which is restricted from the light amount limit, is determined by the light amount of the illumination part 4. This is because when the code goes far away, the contrast of the code on the image, which is taken, cannot be secured. The aforementioned restriction conditions a) and b) are the restriction of far limit.

c) The installable distance, which is restricted from the code size limit is determined because it is impossible to read the code when the entire code does not fit in the imaging visual field. It occurs when the code becomes too close to the imaging part 5, so that it is the restriction of near limit.

d) The installable distance, which is restricted from the stay time limit, is determined by the time (stay time of the code) in which the code passes through the visual field range. When the stay time of code is too short, the time for the number of times of reading which is required by the decoding processing cannot be secured. As the imaging part 5 becomes farther away from the code, the stay time of code becomes longer, so that it is the restriction of near limit.

e) The installable distance, which is restricted from the depth limit, is determined by the depth of field which is calculated from the front depth of field Df and the back depth of field Db of the imaging part 5. In this example, it is the restriction of near limit.

A value between the minimum value dn in the restriction conditions of a) and b), which are the restriction of far limit among the restriction conditions of a) to e), and the maximum value df in the restriction conditions of c) to e), which are the restriction of near limit, becomes the installable distance. For example, the installable distance is (dn+df)/2, so that it can be a distance which has a space to the limit in view of all of the restriction conditions a) to e). Among the restriction conditions a) to e), any one or more than two may be omitted.

Figure 26:
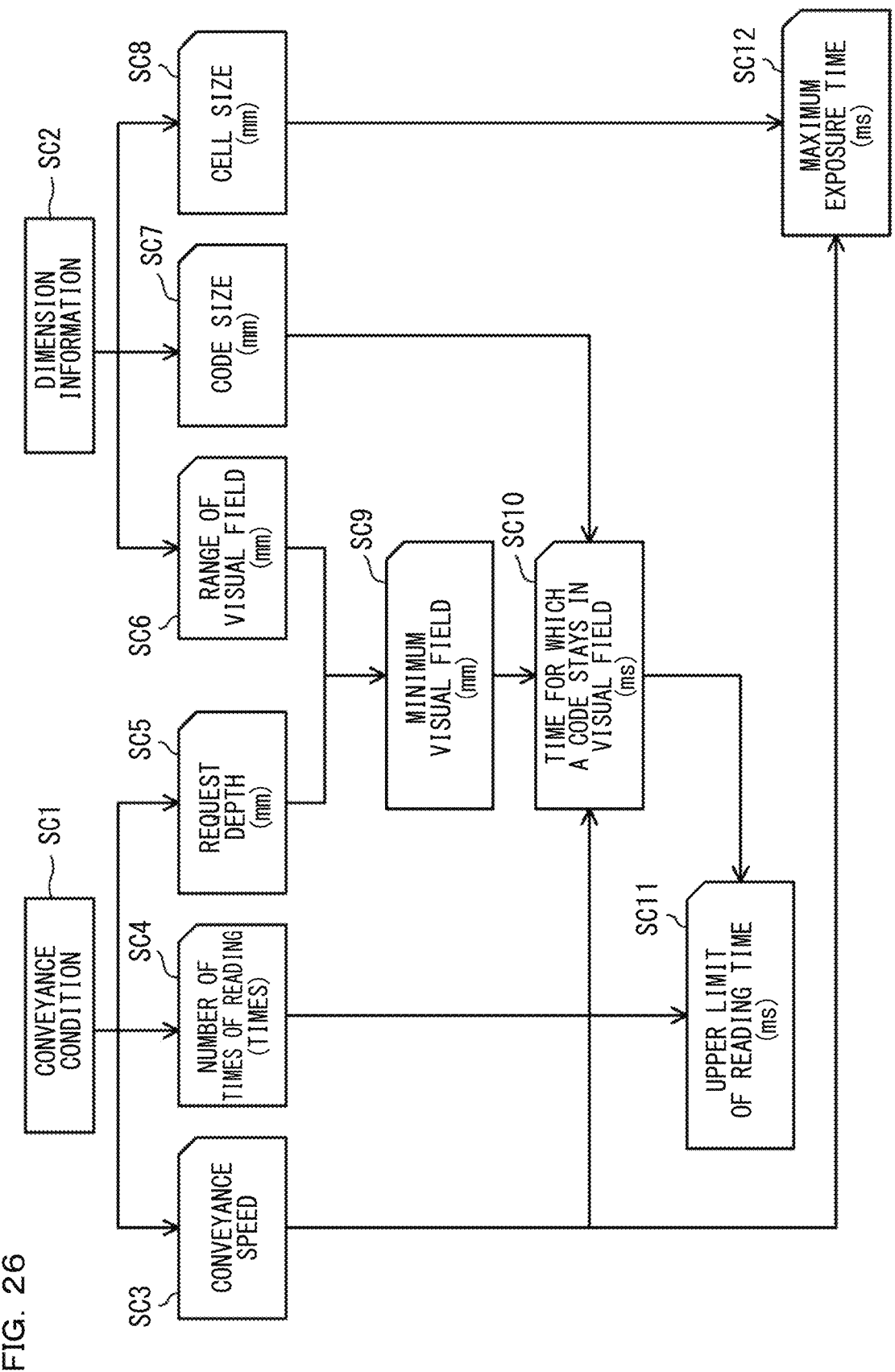
FIG. 26 is a flowchart of a calculation step of a parameter setting condition.

In Step SA10 of the flowchart shown in FIG. 14, the installation distance is read. It proceeds to Step SA11, and a parameter setting condition is calculated. A calculation step of the parameter setting condition is shown in the flowchart of FIG. 26. The conveyance condition inputted in Step SA3 of the flowchart shown in FIG. 14 is read in Step SC1. In Step SC2 of the flowchart shown in FIG. 26, various dimension information calculated in Step SA5 of the flowchart shown in FIG. 14 is read. In Step SC3, the conveyance speed of the workpiece W is read. In Step SC4, the number of times of reading of the code is read. The number of times of reading RC indicates how many times one code is read within the visual field range. A predetermined number may be set preliminarily, or it may be capable of being inputted manually by the user. In Step SC5, a request depth (mm) is read. The request depth may be the height variation which is inputted to the height variation input column 53b. In Step SC6, the visual field range is read. In Step SC7, a code size is read. In Step SC8, a cell size is read.

In Step SC9, the minimum visual field range (mm) is calculated. For example, in a case in which the distance from the optical information reading device 1 to the code varies between dmin and dmax, the nearest visual field range hmin is relative to the distance d from the optical information reading device 1 to the code, so that it is possible to calculate from formula (5).

$$h\text{min} = h \times (d\text{min}/d) \quad (5)$$

In Step SC10, a period of the time (ms) for which the code stays in the imaging visual field is calculated. Since the user knows the visual field range, the code size, and the conveyance speed v of the workpiece W, it is possible to calculate a period of the time (ST) in which the code stays within the imaging visual field from formula (6).

$$ST = (h\text{min} - CS)/v \quad (6)$$

In Step SC11, the upper limit of the reading time (ms) of the code is calculated. When the number of times of reading RC to one code is performed, it is possible to calculate a period of time RT for reading the code at one time from formula (7).

$$RT \leq ST/RC \quad (7)$$

In this way, the upper limit of the permissible reading time at one time is obtained. Here, the RT is simply calculated by dividing the stay time of code with the number of times of reading, but it is not limited to this example. The more precise upper limit may be set by further dividing it with a constant safety factor.

In Step SC12, the maximum exposure time (ms) is calculated. In a case in which the code attached to the workpiece W is read during the conveyance, when the exposure time is too long, the blur easily occurs, so that the reading becomes hard. The permissible blur amount can be specified by a multiple of the cell size p. When the multiple is N, it is possible to calculate the maximum exposure time tmax from formula (8).

$$t\text{max} = (N \cdot p)/v \quad (8)$$

With such way described above, the parameter setting condition in Step SA11 of the flowchart shown in FIG. 14 is calculated. In Step SA12, the upper limit of the exposure time is read. In Step SA13, the parameter setting condition is extracted and it ends.

Figure 27:
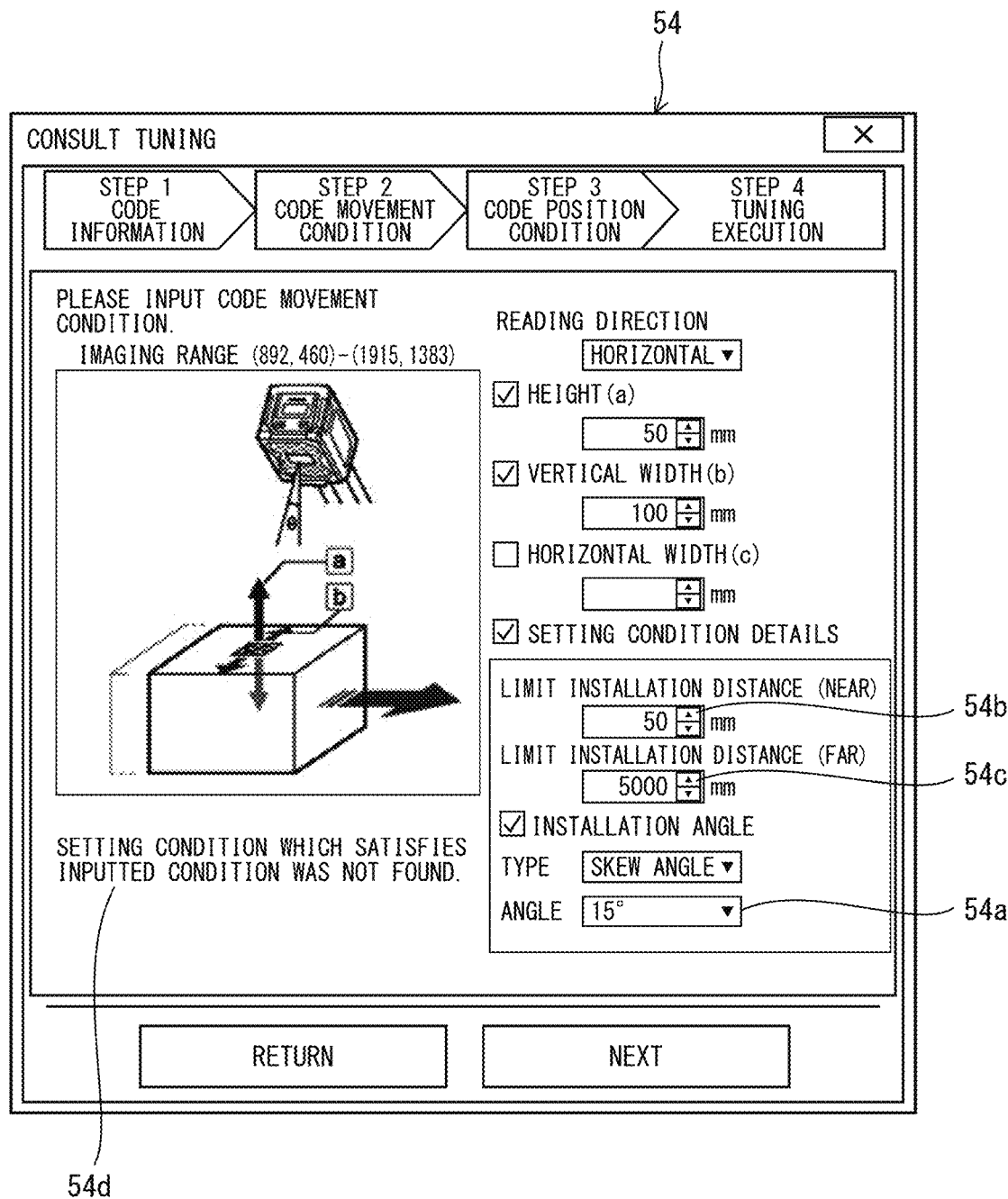
FIG. 27 is an equivalent view of FIG. 23 in a case in which a recommended separation distance is outside a range between a near limit distance and a far limit distance.

As described above, in Step SA9 of the flowchart shown in FIG. 14, the recommended separation distance between the optical information reading device 1 and the code can be calculated. When the recommended separation distance is out of the range between the near limit distance and the far limit distance inputted in the installation condition detail input interface 54 shown in FIG. 23, as shown in FIG. 27, the comment "An installation condition which satisfies inputted condition is not found" is displayed in the comment display area 54d of the installation condition detail input interface 54, and the user is notified that the recommended separation distance is out of the range between the near limit distance and the far limit distance. In this case, it is preferable not to proceed to next step.

Figure 28:
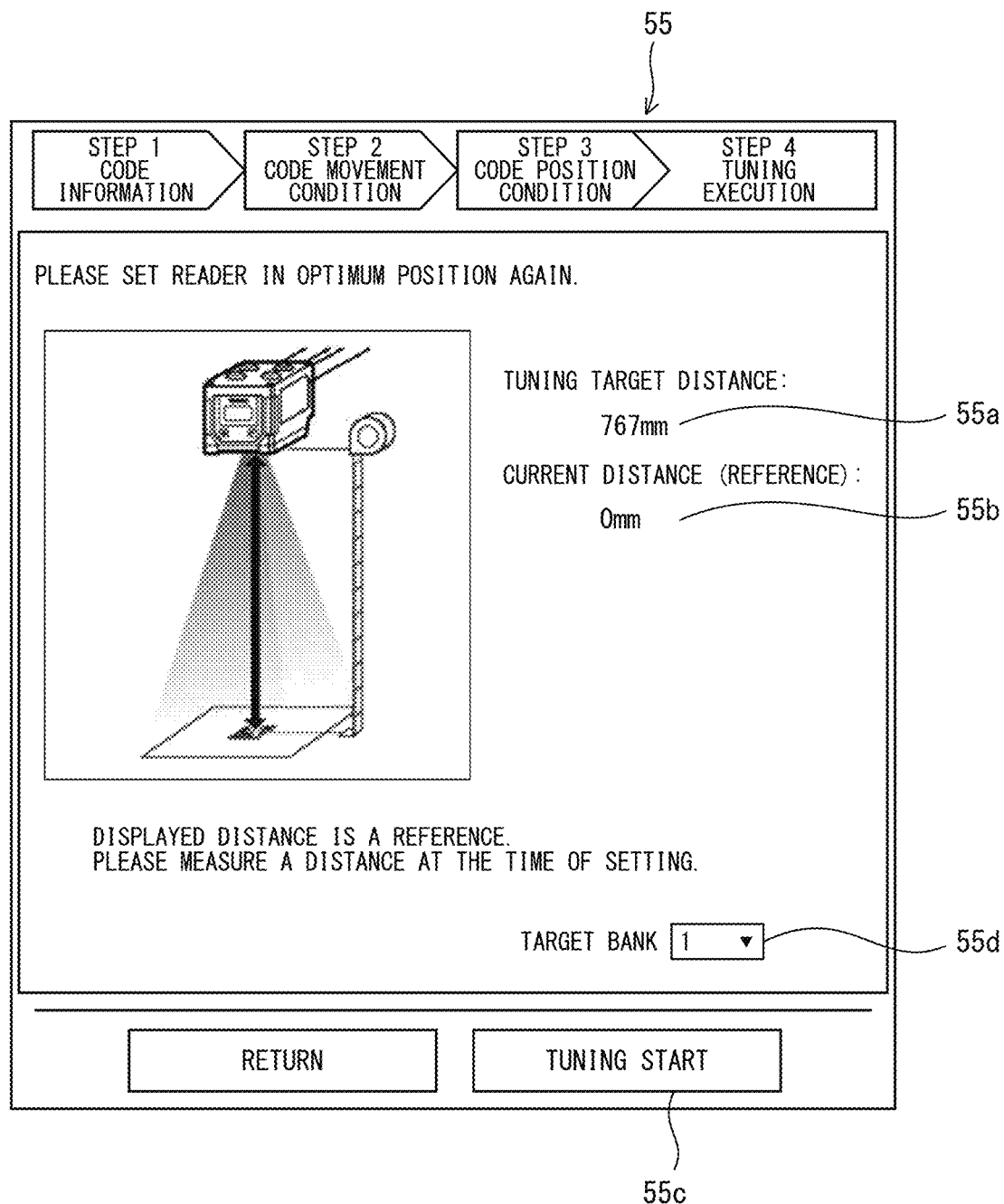
FIG. 28 shows an optimal position presentation interface.

When the recommended separation distance can satisfy the request from the user side, the focusing with respect to the recommended separation distance is performed by operating the AF mechanism 5c of the imaging part 5. An optimal position presentation interface 55 shown in FIG. 28 is displayed in the display part 42 of the computer 100. In the optimal position presentation interface 55, a recommended separation distance display area 55a, which displays a recommended separation distance, and a current distance display area 55b, which displays a separation distance (current distance) between the optical information reading device 1 and the code at the present time, are incorporated. The current distance is the distance which is estimated based on a cell size and an apparent size (PPC) on the image, which is taken. The user can adjust the position of the code with reference to the current distance displayed in the current distance display area 55b so as to adjust the separation distance to be the recommended separation distance.

In the optimal position presentation interface 55, a tuning start button 55c is incorporated. After the separation distance between the optical information reading device 1 and the code became the recommended separation distance, when the tuning start button 55c is clicked, searching for an optimum setting condition, which considers various conditions inputted up until this point, starts.

[When Incorporating in the Tuning Step]

Figure 29:
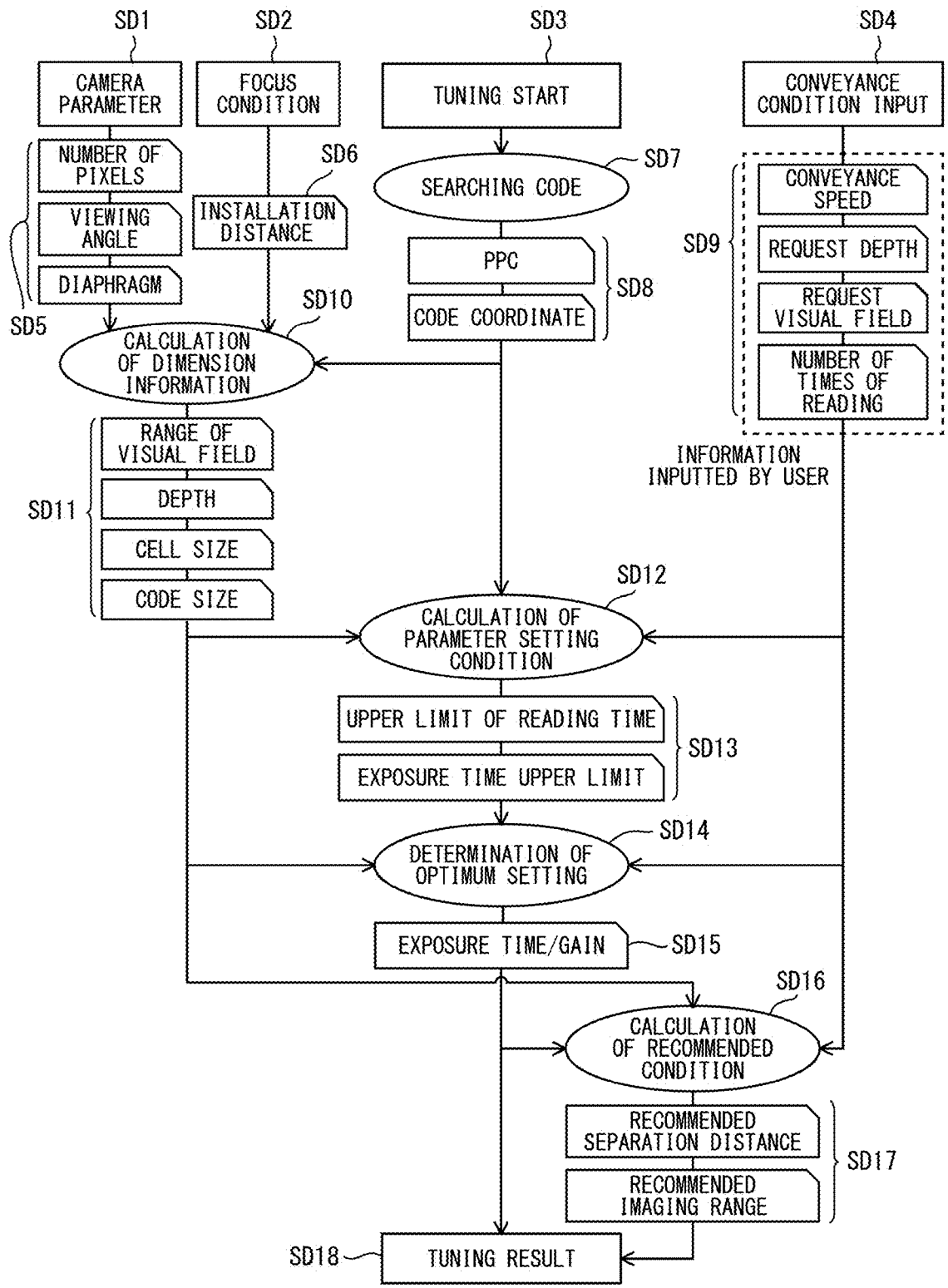
FIG. 29 is a flowchart of a tuning step.

An example when the above described processing is incorporated in the tuning step is shown in the flowchart shown in FIG. 29. In Step SD1, a camera parameter is read in a similar manner as Step SB2 of the flowchart shown in FIG. 17. In Step SD2, a focusing condition is read in a similar manner as Step SB1 of the flowchart shown in FIG. 17. In Step SD4, a conveyance condition is inputted in a similar manner as Step SA3 of the flowchart shown in FIG. 14.

Step SD5 is similar to Steps SB5 to SB7 of the flowchart shown in FIG. 17. Step SD6 is similar to Step SB4 of the flowchart shown in FIG. 17. In Step SD9, each condition, which is calculated from the conditions inputted by the user, is read.

Step SD3 is the starting step of the tuning step, and in Step SD7, searching for a code is performed in a similar manner as Step SA4 of the flowchart shown in FIG. 14. In Step SD8, the PPC and the code coordinates are read.

In Step SD10, the dimension information is calculated in a similar manner as Step SA5 of the flowchart shown in FIG. 14. In Step SD11, each dimension information is read. In Step SD12, the parameter setting conditions are calculated in a similar manner as Step SA11 of the flowchart shown in FIG. 14. In Step SD13, each parameter setting condition is read.

An optimum setting condition is calculated in Step SD14. In Step SD14, the processing from the imaging to the decoding processing is performed multiple times while changing the exposure time, the gain, the brightness, the appropriateness of image processing filters, the strength of image processing filters, etc. in a similar manner as the conventional tuning step. The process in Step SD14 is performed in the tuning part 29c.

The codes included in the plurality of images obtained by the processing are analyzed. The analyzing method is not particularly limited, but for example, this is the method for judging the easiness of decoding processing of the code included in each image. Regarding the easiness of decoding processing, for example, when the average of success rate of reading is high and when there are few reading errors, it can be determined as a case in which the decoding processing is easy. On the contrary, when the success rate of reading is low and when there are many reading errors, it can be determined as a case in which the decoding processing is difficult. The aforementioned average success rate of reading may be used as an index of the easiness of decoding processing of code. The matching level may be used as an index of the easiness of decoding processing of code. The value of the matching level may be, for example, 1 to 100, and as the value becomes greater, the matching level becomes higher.

Further, as the index which indicates the easiness of decoding processing of code, it may be calculated based on the required time for reading, for example, a code. When the required time for reading a code is long, this means that the code decoding processing is difficult. On the other hand, when the required time for reading a code is short, this means that the code decoding processing is easy. In this case, as a score, the required time for reading a code may be simply used as an index. Alternatively, in the case that it takes the longest time, it may be set as "0", and in the case that it takes the shortest time, it may be set as "100", so that the values from 0 to 100 may be used as an index.

The exposure time, gain, and brightness for the most easiness of the decoding processing are determined by comprehensively considering the matching level, the success rate of reading, and the required time for reading a code. Further, in a similar manner, the type of image processing filter and the strength of the image processing filter for the most easiness of decoding processing are determined.

That is, first, in Step SD12, the tuning part 29c calculates the upper limit of the exposure time of the imaging part 5 as a restriction condition for reading a code attached to the workpiece W. After that, in Step SD14, a plurality of images including codes, which are obtained by taking images multiple times while changing the exposure time of the imaging part 5, is analyzed. Based on the results of the analysis, the exposure time of the imaging part 29c is set within the range of the restriction condition which is set in Step SD4. The tuning part 29c reads the exposure time, the gain, etc. in Step SD15.

After that, the recommended conditions are calculated in Step SD16. In the recommended conditions, a recommended separation distance and a recommended imaging range are included. The recommended imaging range is the visual field range in which a code can be excellently read. The calculation results of the recommended conditions are read in Step SD17. A tuning result is outputted in Step SD18. Each parameter, which constitutes the tuning result, is displayed as the parameter setting in the bank in the parameter setting display format 46 shown in FIG. 13, and is stored in the storage device 35. At this point, it is possible to select which bank the parameter setting is stored, and for example, the user can select a bank by using a bank selection pull-down menu 55d which is incorporated in the interface shown in FIG. 28.

Further, without changing the separation distance between the current optical information reading device 1 and the code, it limits the cod readable range (visual field range), or there is a case in which the reading speed may be improved by changing a timing control, which is called as a burst mode, of the imaging by the imaging part 5. The burst mode is the control in which after taking a plurality of images at extremely short interval, the decoding processing is executed. This is the mode which is capable of performing with that case the workpiece W moves at high speed.

Since the change of the code readable range or the change of the timing control widely affects to the range, it is not set as the target item which is automatically optimized by tuning. Therefore, it determines whether or not the setting change is effective. If it judges that it is effective, it may be outputted as the recommended readable range or the recommended timing method.

As the verification whether or not it is effective, the method for measuring the reading time (time required for decoding processing) in a state in which the actual setting is temporally changed may be used, or the method for estimating the change effect with the assumption in which the reading time is in proportion to a size of the visual field range, etc. may be used. In the case in which the readable range is limited, the conveyance direction (vertical direction, horizontal direction with respect to the visual field) inputted in the conveyance condition is read, and without limiting the conveyance direction, it is preferable to limit the direction orthogonal to the conveyance direction. For example, when the conveyance direction is the horizontal direction as shown in the upper side of FIG. 31, the range in the vertical direction is narrowed. On the other hand, when the conveyance direction is the vertical direction as shown in the lower side of FIG. 31, the range in the horizontal direction is narrowed.

Also, the readable range may be further narrowed. For example, in a case in which the code is a bar code, and a condition that the code does not rotate is understood from the conveyance condition, the readable range may be set in a value which is extremely small as one pixel in the vertical direction, so that it is possible to read the code as the one-dimensional waveform. Accordingly, it is possible to realize the reading speed which is close to the laser type optical information reading device.

Further, after the verification of each recommended value has been performed, the reflection of the parameter stetting is performed, and the presentation of the recommended value can be performed. In some cases, after the reflection of the parameter setting, the interface such that the tuning is performed again may be provided. Furthermore, a testing function for testing whether or not the operation is performed in the reflected parameter setting is provided in advance, so that it may be guided to the testing step. In this testing, it is not only the testing of the reading rate or the tact, which is conventionally known, but also the content which can confirm whether or not it is actually performed in correspondence with the inputted conveyance condition.

For example, in order to simply confirm whether or not it is performed in correspondence with the conveyance speed which is inputted as a conveyance condition, the corresponding speed is calculated by the following steps and is presented to the user.

1. A continuous reading of the code, in which the parameter setting determined in the tuning is reflected, is performed.
2. When the reading starts, the user holds a paper, etc. on which the code is attached and the user arbitrarily moves it in front of the imaging part 5.
3. When the reading is successful two times in a row, the $1^{st}$ imaging time t1 and the central coordinate c1 of the code are obtained, and the $2^{nd}$ imaging time t2 and the central coordinate c2 of the code are obtained.
4. A conveyance speed v of the code when the reading is successful can be calculated from formula (9) by using the values t1, t2, c1, c2 obtained in Step 3 and a resolution r.

$$v = r(c2-c1)/(t2-t1) \quad (9)$$

The way of calculating the conveyance speed of the code is schematically shown in FIG. 32.

5. Step 4 is repeated, and the maximum speed when the reading is successful is defined as the corresponding speed. The number of continuous imaging is not limited to two times.

With such procedures, it does not have to perform the verification in an actual line every time the setting is changed, so that the calculation from the extraction of optimum setting to the verification can be completed on a desk, and the time required for the operation preparation can be greatly reduced.

Figure 33:
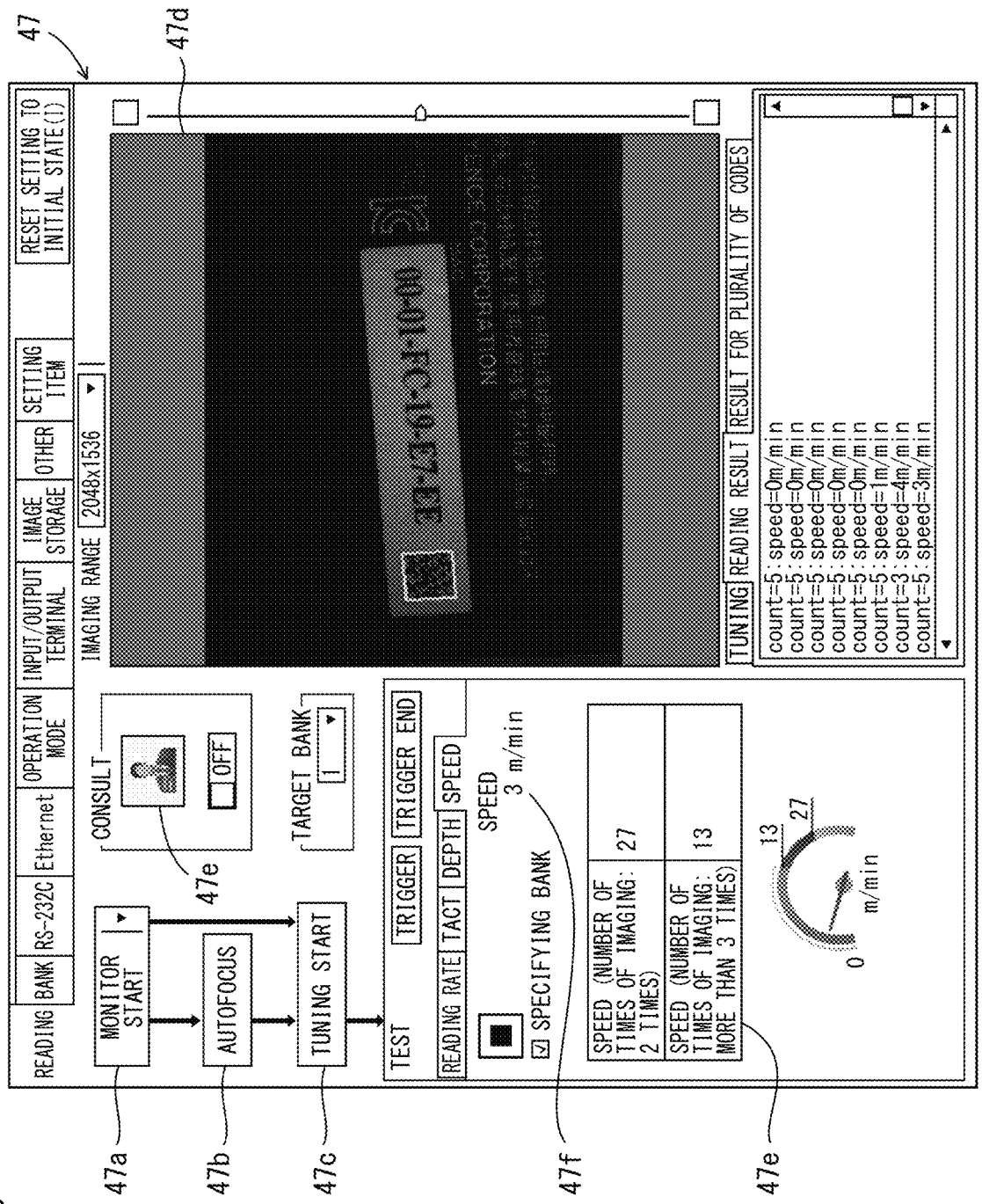
FIG. 33 is an interface showing a number of times of reading success and a display example of moving speed of a code at the time of verification.

Further, as shown in FIG. 33, in the interface for tuning 47, a number of times of success display area 47e, which displays the number of times of success of the reading at the time of verification, a moving speed display area 47*f*, which displays the conveyance speed of the code, can be incorporated. With such structure, the user can recognize the number of times of success of the reading at the time of verification and the moving speed of the code only by looking at the interface for tuning 47. Each display format is one example, and it is not limited to this example.

[Navigation Function]

Figure 30:
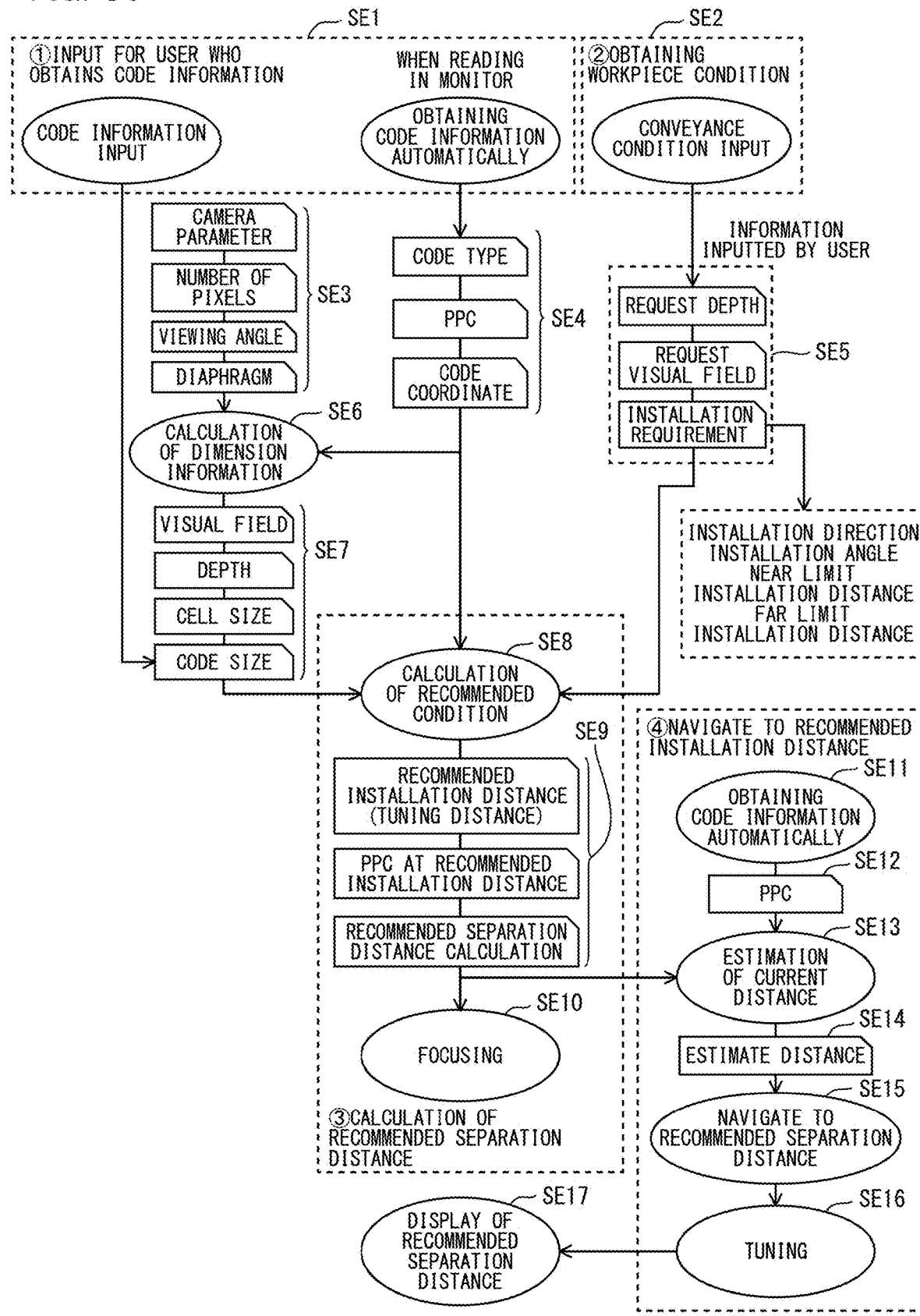
FIG. 30 is a flowchart showing control contents of a navigation function.

The flowchart shown in FIG. 30 shows a navigation function which presents the results of the aforementioned processing to the user and guides to improve the reading accuracy of the code.

In Step SE1, the code information (code type, etc.) is obtained. There is a case in which the user inputs the code information or a case in which it is automatically inputted by a monitor function. In the case of the automatic retrieval, the processing in a similar manner as Step SA4 of the flowchart shown in FIG. 14 may be performed.

In Step SE2, the user inputs the conveyance condition in a similar manner as Step SA3 of the flowchart shown in FIG. 14. In Step SE3, the camera parameter is read in a similar manner as Step SD1, SD2 of the flowchart shown in FIG. 29. In Step SE4, the code type, PPC, and code coordinate are read. In Step SE5, the request condition is read in a similar manner as Step SD9 of the flowchart shown in FIG. 29.

In Step SE6, the dimension information is calculated in a similar manner as Step SD10 of the flowchart shown in FIG. 29. In Step SE7, each dimension information is read in a similar manner as Step SD11 of the flowchart shown in FIG. 29. In Step SE8, the recommended condition is calculated in a similar manner as Step SD16 of the flowchart shown in FIG. 29. The calculation result of the recommended condition is read in Step SE9. In Step SE10, it is focused in a place corresponding to the recommended separation distance by operating the AF mechanism 5*c* of the imaging part 5.

On the other hand, in Step SE11, the code information is automatically retrieved in a similar manner as Step SE1. In Step SE12, the PPC is read. In Step SE13, the separation distance (current distance) between the current optical information reading device 1 and the code is estimated based on the cell size and the apparent size (PPC) on the taken image. In Step SE14, the estimate distance, which was estimated in Step SE13, is read. In Step SE15, for example, the optimal position presentation interface 55 shown in FIG. 28 is displayed in the display part 42 of the computer 100. The recommended separation distance is displayed in the recommended separation distance display area 55*a*, and the current distance is displayed in the current distance display area 55*b*, so as to navigate the current distance to be the recommended separation distance.

After that, it proceeds to Step SE16, and the optimum condition is set in a similar manner as Step SD14 of the flowchart shown in FIG. 29. The recommended separation distance is displayed in Step SE17.

[Execution Step at the Time of Operation]

When the tuning of the optical information reading device 1 is completed as described above, and when the operation preparation of the optical information reading device 1 is completed, the optical information reading device 1 can be operated. At the time of operation of the optical information reading device 1, the reading control is executed. In the reading control, first, the parameter setting, which constitutes the imaging condition from the storage device 35, is read. The imaging condition is the condition, etc. which is determined in the aforementioned tuning step.

In the state in which the parameter setting is valid, that is, the code included in the image, which is newly obtained by the imaging part 5 based on the exposure time and the gain set by the tuning part 29*c*, is decoded. After that, the decoding result is outputted. The outputted decoding result is stored in the decoding storage part 35*a*, and it is used by outputting to the computer 100.

[Existence/Nonexistence Detecting Method of Polarizing Filter Attachment]

As the method for automatically detecting whether or not a detachable member such as the polarizing filter attachment 3 is attached to the body, generally, it is well-known that for example, mechanical switches or electronic contacts are used, but in this case, there is a disadvantage due to the complicated structure.

In this embodiment, without using the mechanical switches or the electronic contacts, it is configured in which the existence/nonexistence of the polarizing filter attachment 3 can be automatically detected. Specifically, the light amount of the irradiated light is reduced by half by passing through the polarizing filter, and further, by using the characteristic in which the light amount of the light is reduced by half by passing through the polarizing filter when the light is received, the existence/nonexistence of the polarizing filter attachment 3 is automatically detected by a software as follows.

That is, first, an image is taken by the imaging part 5 in a state in which the first light emitting diodes 16 are turned on and the second light emitting diodes 17 are turned off. After that, an image is taken by the imaging part 5 in a state in which the first emitting diodes 16 are turned off and the second light emitting diodes 17 are turned on. This order is not fixed, so that either one may be the first. After that, the brightness of the two images is compared, and if it is approximately the same, it is judged that the polarizing filter attachment 3 is not mounted. On the other hand, if the brightness of one of the images is approximately double (or approximately half) in comparison with the brightness of the other image, it is judged that the polarizing filter attachment 3 is mounted.

That is, it is provided with a comparison part which compares the brightness of the image, which is taken in the state in which the light emitting body arranged so as to pass through the polarizing filter of the polarizing filter attachment 3 is irradiated and the light emitting body arranged so as not to pass through the polarizing filter is not irradiated, and the brightness of the image, which is taken in the state in which the light emitting body arranged so as to pass through the polarizing filter of the polarizing filter attachment 3 is not irradiated and the light emitting body arranged so as not to pass through the polarizing filter is irradiated. The existence/nonexistence of the polarizing filter attachment 3 can be automatically detected based on the comparison result of the two images by the comparison part.

[Effects of Embodiment]

As described above, according to the optical information reading device 1 according to the embodiment, the upper limit of the exposure time can be calculated based on the conveyance speed of the workpiece W and the size of cell which constitutes the code (Step SA12). In the tuning step, the exposure time which is less than the upper limit of the exposure time can be set by analyzing the plurality of images which is obtained by taking images multiple times by changing the exposure time (Step SD14). Accordingly, it can be set not only the conveyance speed of the workpiece W, but also the appropriate exposure time in which the cell size is reflected. Therefore, the code included in the image, which is newly obtained by the imaging part 5 by using this exposure time, can be decoded, and the reading accuracy can be enhanced.

The aforementioned embodiments are in respects merely illustrative and are not to be construed in limiting fashion. All modifications and changes within the range of equivalents of the claims are, moreover, within the scope of the present invention.

INDUSTRIAL APPLICABILITY

As described above, the optical information reading device according to the present invention, can be used when codes such as a bar code or a two-dimensional code, etc. are read.

EXPLANATION OF SYMBOLS 1 optical information reading device
5 imaging part
5a imaging element
6 display part
11 select button (input part)
12 enter button (input part)
29 control unit
29c tuning part (imaging condition setting part)
29e recommended separation distance determination part
30 cell size setting part
31 decoding part
35d characteristic information storage part
35e correspondence relation storage part
42 display part
43 input part

What is claimed is:

1. An optical information reading device comprising:
an imaging part including an imaging element which takes an image of a code attached to a workpiece which moves;
an input part inputting a moving speed of the workpiece and a distance from the imaging part to the code based on user operation;
a characteristic information storage part storing a characteristic information which determines a visual field range of the imaging part corresponding to the distance from the imaging part to the code;
a cell size setting part setting a size of a cell which constitutes the code in the image obtained by the imaging part, based on the code included in the image obtained by the imaging part, the distance inputted by the input part and the characteristic information stored in the characteristic information storage part;
an imaging condition setting part having a first function and a second function, wherein
the first function calculates an upper limit of an exposure time of the imaging part based on the moving speed inputted by the input part and the size of the cell set by the cell size setting part, the upper limit is used for tuning a condition for reading the code attached to the workpiece, and
the second function sets the exposure time of the imaging part within the upper limit calculated as the condition by the first function; and
a decoding part decoding code included in an image, which is newly obtained by the imaging part using the exposure time which is set by the second function of the imaging condition setting part.

2. The optical information reading device according to claim 1, wherein
the input part further inputs a moving direction of the workpiece based on user operation, and
the cell size setting part calculates a resolution in the moving direction inputted by the input part, based on the distance inputted by the input part and a number of pixels of the imaging element in the moving direction inputted by the input part, and sets a size of a cell which constitutes the code in the image obtained by the imaging part, based on the resolution and the code included in the image obtained by the imaging part.

3. The optical information reading device according to claim 2, wherein
the cell size setting part calculates the visual field range of the imaging part based on the distance inputted by the input part and a viewing angle of the imaging part stored as the characteristic information in the characteristic information storage part, and calculates a resolution in the moving direction inputted by the input part based on the visual field range and the number of pixels of the imaging element in the moving direction inputted by the input part.

4. The optical information reading device according to claim 2, wherein
the input part includes an input interface for selecting the moving direction of the workpiece, and inputting the moving direction through the input interface.

5. The optical information reading device according to claim 1, wherein
the second function of the imaging condition setting part sets the exposure time of the imaging part within the upper limit calculated as the condition by the first function, by analyzing a plurality of images, each of which includes a code and is obtained by taking images multiple times while changing the exposure time of the imaging part.

6. The optical information reading device according to claim 5, wherein
the imaging condition setting part is configured to take images of a code multiple times by the imaging part while changing the exposure time within the upper limit calculated as the condition by the first function.

7. The optical information reading device according to claim 5, wherein
the imaging condition setting part is configured to set a gain by analyzing the plurality of images obtained by taking images multiple times while changing the gain to the imaging part, and
the decoding part is configured to decode a code included in an image, which is newly obtained by the imaging part by using the gain which is set by the imaging condition setting part.

8. The optical information reading device according to claim 1, wherein
the cell size setting part calculates a value indicating a number of pixels corresponding to one cell constituting the code and sets the size of the cell which constitutes the code in the image obtained by the imaging part, based on said value, the distance and the characteristic information.

9. The optical information reading device according to claim 5, wherein
the second function of the imaging condition setting part starts analyzing the plurality of images when start trigger is inputted by user operation.

10. The optical information reading device according to claim 1, further comprising an illumination part which illuminates the code attached to the workpiece which moves, wherein a polarizing filter is provided in front of the imaging part and a part of the illumination part.

11. An optical information reading method using an optical information reading device having an imaging part including an imaging element which takes an image of a code attached to a workpiece which moves and having a characteristic information storage part storing a characteristic information which determines a visual field range of the imaging part corresponding to the distance from the imaging part to the code, the optical information reading method comprising the steps of:

inputting a moving speed of the workpiece and a distance from the imaging part to the code based on user operation;

calculating a size of a cell which constitutes the code in the image obtained by the imaging part, based on the code included in the image obtained by the imaging part, the inputted distance and the characteristic information stored in the characteristic information storage part, and calculating an upper limit of an exposure time of the imaging part based on the inputted moving speed and the calculated size of the cell, the upper limit being used for tuning a condition for reading the code attached to the workpiece;

setting the exposure time of the imaging part within the calculated upper limit; and decoding code included in an image, which is newly obtained by the imaging part using the set exposure time.

12. An optical information reading method using an optical information reading device having an imaging part including an imaging element which takes an image of a code attached to a workpiece which moves and having a characteristic information storage part storing a characteristic information which determines a visual field range of the imaging part corresponding to the distance from the imaging part to the code, the optical information reading method comprising the steps of:

inputting a moving speed of the workpiece, a moving direction of the workpiece, and a distance from the imaging part to the code based on user operation;

calculating a resolution in the inputted moving direction based on the inputted distance and a number of pixels of the imaging element in the inputted moving direction, calculating a size of a cell which constitutes the code in the image obtained by the imaging part, based on the resolution and the code included in the image obtained by the imaging part, and calculating an upper limit of an exposure time of the imaging part based on the inputted moving speed and the calculated size of the cell, the upper limit being used for tuning a condition for reading the code attached to the workpiece;

setting the exposure time of the imaging part within the calculated upper limit; and decoding code included in an image, which is newly obtained by the imaging part using the set exposure time.

* * * * *